United States Patent [19]
Yamada et al.

[11] Patent Number: 6,067,141
[45] Date of Patent: May 23, 2000

[54] LIQUID CRYSTAL DISPLAY DEVICE WITH REDUCED VIEWING ANGLE DEPENDENCY

[75] Inventors: Nobuaki Yamada, Higashiosaka; Toshikazu Hirata, Tenri; Takashi Kurihara, Tajimi; Masato Imai, Tajimi; Kazuyuki Endo, Tajimi, all of Japan

[73] Assignee: Sharp Kabushiki Kaisha, Osaka, Japan

[21] Appl. No.: 09/220,885

[22] Filed: Dec. 28, 1998

[30] Foreign Application Priority Data

Dec. 26, 1997 [JP] Japan .................................. 9-361002

[51] Int. Cl.[7] .................................................. G02F 1/1337
[52] U.S. Cl. .......................... 349/129; 349/32; 349/130; 349/156
[58] Field of Search ...................... 349/129, 156, 349/130, 32

[56] References Cited

U.S. PATENT DOCUMENTS

| | | | |
|---|---|---|---|
| 5,379,139 | 1/1995 | Sato et al. | 359/81 |
| 5,499,128 | 3/1996 | Hasegawa et al. | 359/81 |
| 5,673,092 | 9/1997 | Horie et al. | 349/86 |
| 5,725,406 | 3/1998 | Togawa | 445/24 |
| 5,800,232 | 9/1998 | Miyazaki | 445/24 |
| 5,838,414 | 11/1998 | Lee | 349/157 |
| 5,844,639 | 12/1998 | Togawa | 349/32 |
| 5,844,643 | 12/1998 | Onishi et al. | 349/156 |
| 5,861,932 | 1/1999 | Inata et al. | 349/156 |
| 5,880,803 | 3/1999 | Tamai et al. | 349/156 |
| 5,886,467 | 3/1999 | Kimura | 313/582 |
| 5,905,558 | 5/1999 | Tokunaga et al. | 349/149 |

FOREIGN PATENT DOCUMENTS

| | | |
|---|---|---|
| 1-217396 | 8/1989 | Japan . |
| 5-265931 | 9/1992 | Japan . |
| 6-194655 | 7/1994 | Japan . |
| 7-84260 | 3/1995 | Japan . |
| 7-120728 | 5/1995 | Japan . |
| 9-73084 | 3/1997 | Japan . |
| 9-197384 | 7/1997 | Japan . |

*Primary Examiner*—Rodney Bovernick
*Assistant Examiner*—Tarifur R. Chowdhury
*Attorney, Agent, or Firm*—Nixon & Vanderhye, P.C.

[57] ABSTRACT

The liquid crystal display device of this invention includes a pair of substrates and a liquid crystal layer including liquid crystal molecules having a negative dielectric anisotropy interposed between the pair of substrates, vertical alignment layers being formed on surfaces of the pair of substrates in contact with the liquid crystal layer, a voltage being applied across the liquid crystal layer by voltage application means formed on the pair of substrates, the liquid crystal molecules being oriented substantially vertical to the pair of substrate when no voltage is applied, wherein a plurality of column structures are provided so as to be at least partly in contact with the pair of substrates, and the liquid crystal layer has a plurality of liquid crystal domains in a direction in the plane of the substrates, and, when a voltage is applied, orientation directions of the liquid crystal molecules are continuous in each of the liquid crystal domains, while the orientation directions of liquid crystal molecules are random among the liquid crystal domains.

19 Claims, 14 Drawing Sheets

FIG. 3A    (ON)
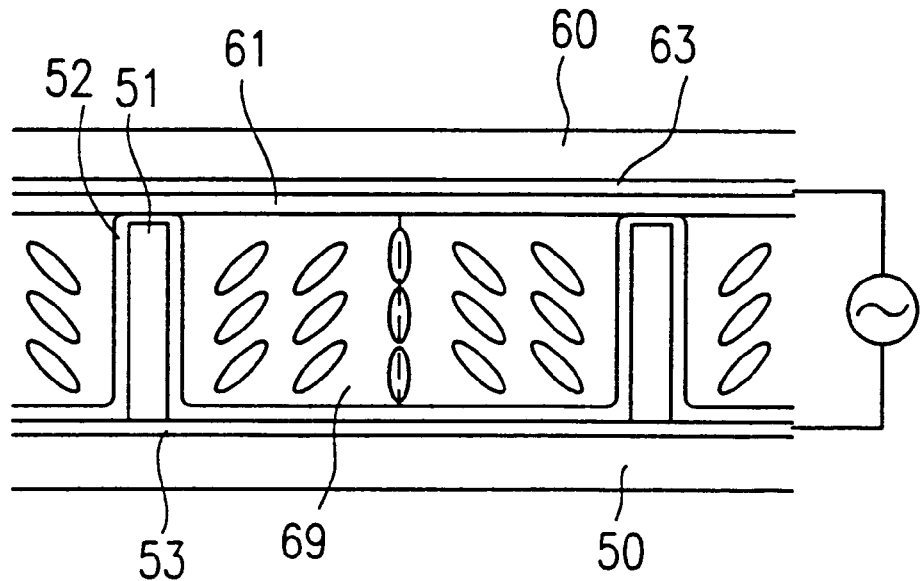
FIG. 3B    (OFF)
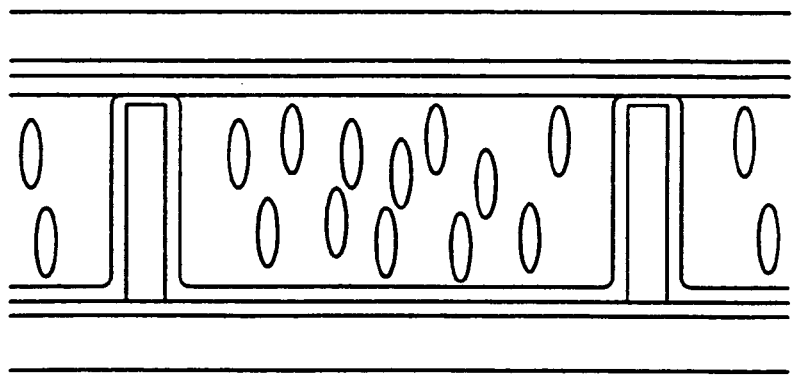

LIQUID CRYSTAL DISPLAY DEVICE WITH REDUCED VIEWING ANGLE DEPENDENCY

BACKGROUND OF THE INVENTION

1. Field of the Invention

The present invention relates to a liquid crystal display device (LCD) used as a display means for computers, audio and video apparatuses, and the like.

2. Description of the Related Art

In recent years, the application of liquid crystal panels utilizing the electrooptic properties of a liquid crystal material to office automation apparatuses and the like has progressed vigorously by achieving a large screen size and a large capacity. At present, liquid crystal display panels generally available in the market employ a twisted nematic (TN) type operation mode, where the orientation directions of liquid crystal molecules in a liquid crystal layer are twisted by 90° between two glass substrates. In such a TN type operation mode, a light transmission intensity varies depending on the viewing direction when a voltage is applied, causing asymmetry of the viewing angle characteristics. The asymmetry of the viewing angle characteristics raises a problem especially in the case of gray-scale display. That is, an extreme reduction in contrast ratio occurs or the contrast ratio is inverted (e.g., positive to negative) depending on the viewing direction, resulting in reducing the display quality.

In order to overcome the above problem, in recent years, attempts for increasing the viewing angle of TN-type liquid crystal display panels have been intensively performed. For example, a technique disclosed in SID 93 Digest, p. 622 (1993) attempts to increase the angle of visibility in the following manner: Alignment films for controlling the orientation of liquid crystal molecules are not rubbed to allow the liquid crystal molecules to randomly orient, thereby forming multiple domains having different orientation directions. This technique is called "random orientation TN". According to this technique, a liquid crystal material is sealed in a space between a pair of substrates, to the inner surfaces of which polyimide alignment films are applied without rubbing, at a temperature equal to or more than a nematic-isotropic phase transition temperature. The liquid crystal material is then cooled, to allow liquid crystal molecules to randomly orient. In this way, multiple domains (microdomains), among which the orientation directions of the liquid crystal molecules are different, are formed, so as to increase the viewing angle.

Hereinbelow, the display method of a liquid crystal display panel having randomly oriented liquid crystal molecules without rubbing will be described with reference to FIG. 10.

FIG. 10 is a schematic view illustrating the orientation state of non-rubbed randomly oriented liquid crystal molecules of a liquid crystal display panel observed when no electric field is applied. This liquid crystal display panel includes an upper glass substrate 201 and a lower glass substrate 202 which have non-rubbed polyimide alignment films (not shown) facing each other with a predetermined space therebetween. A chiral nematic liquid crystal material 207, which has a spontaneous twisting angle of about 90° between the glass substrates 201 and 202 and a positive dielectric anisotropy (P type), is sealed in the space between these substrates at a temperature equal to or more than a nematic-isotropic phase transfer temperature, and then cooled to room temperature to form a liquid crystal layer 220. In this way, liquid crystal molecules 217 and 227 located at the interfaces with the glass substrates 201 and 202, respectively, are oriented completely randomly with an equivalent probability among respective liquid crystal domains (microdomains) 210 at the interfaces with the glass substrates 201 and 202. In each of the liquid crystal domains 210, however, the liquid crystal molecules 217 located at the interface with the upper glass substrate 201 and the liquid crystal molecules 227 located at the interface with the lower glass substrate 202 are oriented in the states twisted by 90° from each other.

In such a liquid crystal display panel, a liquid crystal molecule 237 located in a mid-plane defined by a plane assumed to be positioned in the center of the liquid crystal layer 220 interposed between the substrates 201 and 202 in the thickness direction thereof in parallel with the substrates, is oriented substantially horizontally with respect to the substrates when no voltage is applied. When a voltage is applied, the liquid crystal molecule 237 is gradually tilted so that a dielectric free energy is reduced, i.e., so that the major axis of the liquid crystal molecule 237 is aligned with the direction of the electric field (generally, the direction vertical to the surface of the substrate) if the liquid crystal material has a positive dielectric anisotropy. As the applied voltage is increased, the liquid crystal molecule 237 gradually rises in the vertical direction. In the case where the liquid crystal material has a twisting angle of 90°, since the liquid crystal molecule 237 in the mid-plane is located in the middle between the upper and lower glass substrates 201 and 202, the twisting angle of the liquid crystal molecule 237 in the mid-plane is just a half of the total twisting angle, i.e., 45° which is a half of the twisting angle formed by the liquid crystal molecules 207 located at the interface with the upper glass substrate 201 and the liquid crystal molecules 227 located at the interface with the lower glass substrate 202.

The tilt direction of the liquid crystal molecule 237 in the mid-plane when a voltage is applied determines the direction of the viewing angle characteristic. Thus, although one liquid crystal domain 210 has a certain viewing angle characteristic, since a sufficiently large number of liquid crystal domains 210 having random orientation directions of liquid crystal molecules exist in one pixel region, the viewing angle characteristics of the liquid crystal domains are macroscopically averaged. As a result, the light transmittance in various viewing directions become substantially symmetric, causing a reduction of the viewing angle dependence of display quality, including a reduction or inversion of a contrast ratio.

A technique for further increasing the contrast by applying the random orientation method described above to a vertical orientation mode is disclosed in Japanese Laid-Open Publication No. 7-84260. In this technique, a liquid crystal material having a negative dielectric anisotropy (N type) is used for a liquid crystal layer, and vertical alignment films are formed on two substrates, so as to realize a normally-black mode where liquid crystal molecules in the liquid crystal layer are oriented substantially in parallel with the substrate surfaces when a voltage is applied. FIG. 11 is a perspective view illustrating the microscopic orientation state of liquid crystal molecules in one pixel realized by this technique.

Referring to FIG. 11, the reference numeral 253 denotes an orientation direction (director) of a liquid crystal molecule. A plurality of microdomains 254, 255, 256, and 257 having different directors at the substrate surfaces and thus at the mid-plane in one pixel region are formed. As used herein, the expression that "the orientation directions of liquid crystal molecules are different among microdomains or liquid crystal domains" means that the average orientation directions of a plurality of liquid crystal molecules in respective liquid crystal domains, i.e., the average azimuthal directions of the major axes of liquid crystal molecules in respective liquid crystal domains are different among the liquid crystal domains in the mid-plane which is parallel to the surfaces of the substrates sandwiching a liquid crystal layer. A disclination line 258 is observed at a boundary of adjacent microdomains since the adjacent microdomains have different orientation directions.

A technique for further improving the contrast and the display quality obtained in the random orientation method described above is disclosed in Japanese Laid-Open Publication No. 9-73084. FIG. 12A is a sectional view of a liquid crystal display device employing this technique, and FIG. 12B is a partially enlarged perspective view of the liquid crystal panel, schematically illustrating the orientation state of liquid crystal molecules in liquid crystal domains (microdomains).

The liquid crystal display device shown in FIG. 12A includes an upper glass substrate 101 and a lower glass substrate 102 in parallel with each other interposing a predetermined gap therebetween. Each of the glass substrates 101 and 102 includes a transparent electrode 103 on one surface and a polarizing plate 106 on the opposite surface. The transparent electrodes 103 are located on the inner surfaces of the glass substrates of the opposing glass substrates, while the polarizing plates 106 are located on the outer surfaces of the glass substrates. The two polarizing plates 106 are disposed on the outer surfaces of the glass substrates 101 and 102 of the panel so that the polarization axes thereof cross each other at about 90°.

Microscopic unit liquid crystal cells (i.e., liquid crystal domains) 110 are formed between the glass substrates 101 and 102. The liquid crystal domains 110 are enclosed by polymer walls 108 standing substantially vertical to the substrates, to be divided from one another. A nematic liquid crystal material 107 having a positive dielectric anisotropy (hereinbelow, occasionally simply called a liquid crystal material) is sealed in the respective liquid crystal domains 110. The reference numerals 104 and 105 denote a seal member and a spacer bead, respectively.

Referring to FIG. 12B, a liquid crystal domain 110a includes liquid crystal molecules having orientation directions (directors) 117, 127, and 137. In this example shown in FIGS. 12A and 12B, the liquid crystal molecules have a 90° twisted orientation along a direction normal to the substrates. Within one liquid crystal domain 110a, the orientation directions 117, 127, and 137 of the liquid crystal molecules are substantially uniform in the corresponding planes parallel to the substrates (e.g., the mid-plane 111). However, they are random among different liquid crystal domains (e.g., liquid crystal domains 110a, 110b, and 110c). Accordingly, by providing a sufficiently large number of liquid crystal domains 110 in one pixel region, the orientation directions of liquid crystal molecules are macroscopically averaged through the entire liquid crystal panel. This makes the transmittance intensities in various observation directions substantially symmetric, and thus improves the viewing angle dependency.

A plasma addressed liquid crystal display device (PALC) has been developed as a large-size liquid crystal display device exceeding a 20-inch type, in place of a TFT-LCD, for use in a future wall type television set and the like. Techniques for realizing the PALC are disclosed in Japanese Laid-Open Publication No. 1-217396 and No. 4-285931. As a technique for increasing the viewing angle of a TN type liquid crystal display panel, Japanese Laid-Open Publication No. 7-120728 discloses an axially symmetric aligned microcell mode (ASM mode) where liquid crystal molecules are oriented axial symmetrically in each pixel region. As another technique for increasing the angle of visibility of a liquid crystal cell, Japanese Laid-Open Publication No. 9-197384 discloses a technique where the above-mentioned ASM mode is applied to the plasma addressed liquid crystal display device described above.

FIG. 13A is a sectional view of a typical plasma addressed liquid crystal display device 300 operating in the ASM mode, and FIG. 13B is a plan view illustrating one pixel region of the plasma addressed liquid crystal display device.

Referring to FIG. 13A, the plasma addressed liquid crystal display device 300 has a flat panel structure including a display cell 301 and a plasma cell 302. The display cell 301 displays images by modulating incident light to output light according to pixel signals. The plasma cell 302 scans (addresses) the display cell 301. The display cell 301 and the plasma cell 302 share an intermediate sheet 303.

The plasma cell 302 includes stripe-shaped discharge channels 305 arranged in a row direction for sequentially discharging plasma to scan the display cell 301 in a line-sequential manner. The discharge channels 305 include partitions 307 for defining respective spaces of the discharge channels 305, anode electrodes A located at the bottoms of the partitions 307, and cathode electrodes K located in the middle between the adjacent anode electrodes A. The anode electrodes A and the cathode electrodes K relate to opposite electrical polarity from each other and space apart from each other. The anode and cathode electrodes, made of a material which does not transmit light, define physical apertures therebetween, to allow light incident on the liquid crystal display device to pass through only these physical apertures.

The display cell 301 includes stripe-shaped signal electrodes 310 arranged in a column direction so as to cross the row direction in which the discharge channels 305 are lined. Pixel regions are formed at the spatially crossing region of the discharge channels 305 and the signal electrodes 310. The signal electrodes 310 apply image signals to a display medium layer 309 in synchronization with the line-sequential scanning, to modulate the incident light for each pixel. The display cell 301 further includes section walls 317 formed in a lattice shape. The section walls 317 serve to regulate the orientation of liquid crystal molecules in liquid crystal regions defined by the section wall 317 so as to be axial symmetric.

The plasma cell 302 includes a glass substrate 304 and is bonded to the back surface of the intermediate sheet 303, while the display cell 301 includes a glass substrate 308 and is bonded to the top surface of the intermediate sheet 303. For example, a liquid crystal material is enclosed in a space between the glass substrate 308 and the intermediate sheet 303 to form the display medium layer 309. A color filter 313 is formed on the inner surface of the glass substrate 308.

Referring to FIG. 13B, the display medium layer 309 is divided into liquid crystal regions 315 which are surrounded by the section walls 317 formed in a lattice shape. The respective liquid crystal regions 315 are defined by the section walls 317 with respect to the positions and sizes thereof. Liquid crystal molecules in the respective liquid crystal regions 315 are controlled to be oriented axial symmetrically by the alignment force of the surfaces of the section walls 317. In FIG. 13B, the cathode electrode K is shown to be disposed in the middle of the discharge channel 305 with the anode electrodes A disposed on the sides thereof. Two physical apertures spaced apart from each other are therefore formed in one pixel region 311. The portion where each of the physical apertures of the plasma cell 302 and each of the liquid crystal regions 315 overlap each other defines an aperture which contributes to display. In FIG. 13B, two liquid crystal regions 315 are formed in one pixel region 311 so as to correspond to the two physical apertures.

The above-describe prior art techniques have respective problems as follows.

In the technique disclosed in SID 93 Digest shown in FIG. 10, liquid crystal molecules in the liquid crystal layer are oriented substantially in parallel to the substrate surfaces when a voltage is not applied. When a voltage equal to or more than a threshold value is applied, the display device operates in a normally-white mode where the liquid crystal molecules are oriented in a direction substantially vertical to the substrate surfaces. In this state where a voltage equal to or more than a threshold value is applied, a disclination line is generated at the boundary of liquid crystal domains having different initial orientation states. Therefore, according to this technique, although the angle of visibility increases, the disclination line is displayed as a bright line when an image is observed in a tilt direction, generating light leakage and thus failing to obtain a sufficiently high contrast. Moreover, a high driving voltage is required due to the disclination line.

In the technique disclosed in Japanese Laid-Open Publication No. 7-84260 shown in FIG. 11, the sizes of the microdomains 254, 255, 256, and 257 are not restricted. If the number of microdomains in one pixel region is not sufficiently large, it may not be possible to secure a sufficiently large number of microdomains where the orientation directions of liquid crystal molecules are different among the microdomains so as to provide the state in which the liquid crystal molecules are randomly oriented through the entire pixel region. If the orientation directions of liquid crystal molecules do not obtain random orientation through the entire pixel region, the viewing angle dependency remains. Moreover, if the size of the microdomains is not sufficiently small, the difference in the transmittance intensity among the microdomains is observed as an uneven display, markedly reducing the display quality.

In the technique disclosed in Japanese Laid-Open Publication No. 9-73084 shown in FIGS. 12A and 12B, the polymer walls substantially vertical to the substrate surfaces are formed around the respective microdomains to control the size of the microdomains. A number of polymer walls are formed in each pixel region. If such polymer walls are light-blocking walls which do not transmit light, they exist as regions which cannot contribute to display during a white display, reducing the aperture ratio of the display device. If the polymer walls are transparent, bright spots are generated due to light leakage through the polymer walls during a black display. Moreover, since this technique employs the normally-white (NW) mode, the problem described in relation with the technique disclosed in SID 93 Digest arises. That is, when a voltage equal to or more than a threshold value is applied, a disclination line is generated at the boundary of liquid crystal domains having different initial orientation states. Therefore, although the angle of visibility increases, the disclination line is observed as a bright line in a NW mode when an image is observed in a tilt direction, generating light leakage and thus failing to obtain a sufficiently high contrast ratio. Moreover, a high driving voltage is required due to the disclination line.

In the plasma addressed liquid crystal display device disclosed in Japanese Laid-Open Publication No. 9-197384 shown in FIGS. 13A and 13B, the portion where each physical aperture formed between the anode electrode A and the cathode electrode K of the plasma cell and each liquid crystal region of the display cell overlap each other defines an aperture which contributes to display. In such a plasma addressed liquid crystal display device, the plasma cell and the display cell are fabricated separately and then bonded together to complete the device. In order to secure an aperture having a designed area, therefore, the plasma cell and the display cell must be precisely aligned with each other when they are bonded. However, since the cathode electrodes K, the anode electrodes A, and the partitions 307 are formed by a printing process, the patterning precision is as low as about ±10 µm. Accordingly, in order to secure the designed area of the aperture, a large alignment margin is required. This increases the area of regions which cannot contribute to display and reduces the aperture ratio of the display device. Moreover, since precise alignment is required, the production yield reduces and thus the production cost increases.

SUMMARY OF THE INVENTION

The liquid crystal display device of this invention includes a pair of substrates and a liquid crystal layer including liquid crystal molecules having a negative dielectric anisotropy interposed between the pair of substrates, vertical alignment layers being formed on surfaces of the pair of substrates in contact with the liquid crystal layer, a voltage being applied across the liquid crystal layer by voltage application means formed on the pair of substrates, the liquid crystal molecules being oriented substantially vertical to the pair of substrate when no voltage is applied, wherein a plurality of column structures are provided so as to be at least partly in contact with the pair of substrates, and the liquid crystal layer has a plurality of liquid crystal domains in a direction in the plane of the substrates, and, when a voltage is applied, orientation directions of the liquid crystal molecules are continuous in each of the liquid crystal domains, while the orientation directions of liquid crystal molecules are random among the liquid crystal domains.

In one embodiment of the invention, the plurality of column structures are arranged regularly.

In another embodiment of the invention, the plurality of column structures are arranged at four corners of each square of a lattice or at four corners of each square of a lattice and a center of the each square.

In still another embodiment of the invention, the corners of each square of the lattice at which the plurality of column structures are arranged are regularly displaced.

In still another embodiment of the invention, a pitch at which the plurality of column structures are arranged is in the range of 10 µm to 300 µm inclusive.

In still another embodiment of the invention, a size of the plurality of column structures is in the range of 5 µm to 100 µm inclusive.

In still another embodiment of the invention, an alignment fixing layer made of a polymer material is formed on a surface of at least one of the pair of substrates facing the liquid crystal layer.

In still another embodiment of the invention, at least a surface of the pair of substrates on which the plurality of column structures are formed is subjected to surface treatment.

Alternatively, the liquid crystal display device of this invention includes a pair of substrates and a liquid crystal layer including liquid crystal molecules having a negative dielectric anisotropy interposed between the pair of substrates, a vertical alignment layer is formed on surfaces of the pair of substrates facing the liquid crystal layer, a voltage being applied to the liquid crystal layer by voltage application means formed on the pair of substrates, the liquid crystal molecules being oriented substantially vertical to the pair of substrates when no voltage is applied, wherein the voltage application means include a plasma cell having a plurality of plasma channels for discharging plasma, a plurality of column structures are provided so as to be at least partly in contact with the pair of substrates, and the liquid crystal layer has a plurality of liquid crystal domains in a direction in the plane of the substrates, and, when a voltage is applied, orientation directions of liquid crystal molecules are substantially uniform in each of the liquid crystal domains, while the orientation directions of liquid crystal molecules are random among the liquid crystal domains.

In one embodiment of the invention, the plurality of column structures are arranged regularly.

In another embodiment of the invention, the plurality of column structures are arranged at four corners of each square of a lattice or at four corners of each square of a lattice and a center of each square.

In still another embodiment of the invention, the corners of each square of the lattice at which the plurality of column structures are arranged are regularly displaced.

In still another embodiment of the invention, a pitch at which the plurality of column structures are arranged is in the range of 10 $\mu$m to 300 $\mu$m inclusive.

In still another embodiment of the invention, a size of the plurality of column structures is in the range of 5 $\mu$m to 100 $\mu$m inclusive.

In still another embodiment of the invention, an alignment fixing layer made of a polymer material is formed on a surface of at least one of the pair of substrates facing the liquid crystal layer.

In still another embodiment of the invention, at least a surface of the pair of substrates on which the plurality of column structures are formed is surface-finished.

Alternatively, the liquid crystal display device of the invention includes: a pair of substrates; a liquid crystal layer including liquid crystal molecules having a negative dielectric anisotropy interposed between the pair of substrates; and voltage application means for applying a voltage to the liquid crystal layer, the liquid crystal molecules in the liquid crystal layer being oriented substantially vertical to the surfaces of the pair of substrates when no voltage is applied, the liquid crystal display device further including: a plurality of column structures formed on at least one of the pair of substrates; and vertical alignment films formed on surfaces of the plurality of column structures and on a surface of the substrate on which the plurality of column structures are formed, wherein a plurality of liquid crystal domains having different orientation directions are formed around each of the plurality of column structures due to an orientation regulating force of the vertical alignment film formed on the surfaces of the plurality of column structures.

Thus, according to the present invention, the liquid crystal layer includes a number of microdomains (liquid crystal domains) in the substrate surface direction, and liquid crystal molecules are oriented substantially in parallel with the substrate when a voltage is applied. Since the column structures which are formed to be at least partly in contact with the upper and lower substrates serve as orientation regulating elements for the liquid crystal molecules to control the size and the position of the liquid crystal domains, a sufficiently large number of liquid crystal domains can be formed in each pixel region. In this way, the orientation directions of the liquid crystal molecules are macroscopically averaged through the entire liquid crystal panel. The transmittance intensity in various observation directions is substantially made symmetric, eliminating the viewing angle dependency and thus improving the display quality of the liquid crystal display device. Moreover, since the size of each liquid crystal domain can be made too small to be visible by the human eyes, a display without an uneven display can be obtained, and thus the display quality of the liquid crystal display device can be improved.

When the column structures as the orientation regulating elements are formed to be in contact with the upper and lower substrates, they can also serve as spacers for controlling the thickness of the liquid crystal layer of the liquid crystal cell. This improves the yield and reduces the production cost.

In the configuration where the column structures are arranged regularly, liquid crystal domains of substantially the same size and shape can be formed. As a result, the orientation directions of liquid crystal molecules can be averaged macroscopically through the entire liquid crystal panel, and thus the transmittance intensity in various observation directions is made substantially symmetric, eliminating the viewing angle dependency. Thus, the display quality of the liquid crystal display device can be further improved.

Since the orientation of the liquid crystal molecules are regulated by the column structures, the occupation of the area of regions which do not contribute to display, i.e., do not include a liquid crystal material in one pixel or aperture with respect to the pixel or aperture can be reduced. Accordingly, a liquid crystal display device with high contrast and excellent viewing angle characteristics can be realized without reducing the aperture ratio.

In the case where the alignment fixing layer is formed on the surface of one of the pair of substrates facing the liquid crystal layer, the liquid crystal molecules can be preconditioned to tilt in the direction which the liquid crystal molecules fall from the direction vertical to the surface, when a voltage is applied. Accordingly, the rising time to shift to the non-voltage applied state is shortened, increasing the response speed.

In the case where a surface treatment is performed on the surface of at least one of the pair of substrates where the column structures are formed, the vertical alignment film can be formed with good adhesion.

By applying the liquid crystal display device to a plasma addressed liquid crystal display device, the area of the column structures existing in one pixel or aperture with respect to the area of the pixel or aperture can be reduced. Also, by appropriately selecting the pitch of the arrangement of the column structures, liquid crystal domains sufficiently smaller than the pixel region can be formed. This makes it possible to use most of the regions where the transparent signal electrodes are formed as effective apertures of the liquid crystal cells. As a result, unlike the conventional plasma addressed liquid crystal display device, a precise positioning is not required at the bonding of the plasma cell and the display cell so that the physical openings of the plasma cell and the liquid crystal regions of the liquid crystal cell are aligned as precise as possible in order to obtain the aperture area as designed. Instead, the plasma cell and the display cell can be bonded without the necessity of alignment. This improves the yield and thus greatly reduces the production cost.

Thus, the invention described herein makes possible the advantage of providing a liquid crystal display device which has an excellent all-direction viewing angle characteristic, is free from an uneven display in the display, and can exhibit a high contrast.

This and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention will be described specifically with reference to accompanying drawings.

Figure 1A:
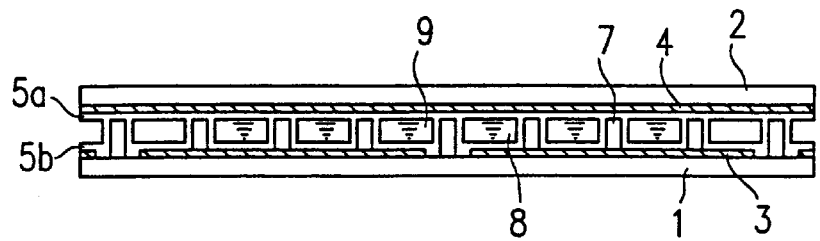
FIG. 1A is a sectional view of a liquid crystal display device according to the present invention.
Figure 1B:
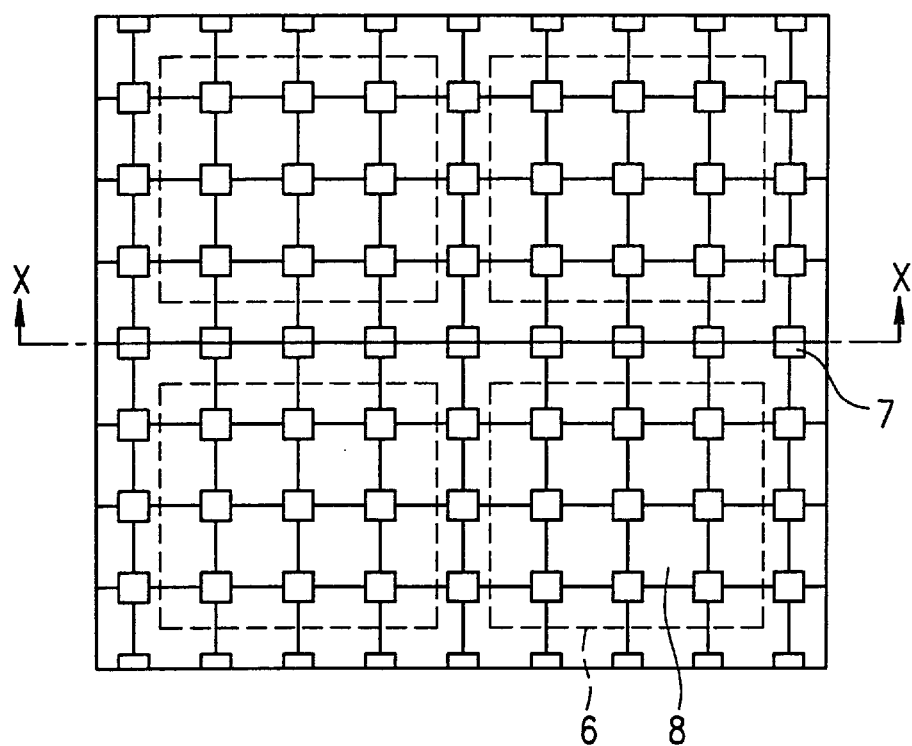
FIG. 1B is a plan view of the liquid crystal display device of FIG. 1A.

FIGS. 1A and 1B schematically illustrate a liquid crystal display device according to the present invention, where FIG. 1A is a sectional view thereof taken along line X—X of FIG. 1B which is a plan view thereof.

Referring to FIGS. 1A and 1B, the liquid crystal display device includes a pair of substrates, e.g., a lower glass substrate 1 and an upper glass substrate 2, facing each other with a predetermined space therebetween, and a liquid crystal layer 9 formed between the pair of substrates. A seal member (not shown) is provided around the peripheries of the substrates 1 and 2 to seal the liquid crystal layer 9. A plurality of column structures 7 which serve as elements for regulating the orientation of liquid crystal molecules in the liquid crystal layer 9 are provided in the space between the lower glass substrate 1 and the upper glass substrate 2 at predetermined positions so that they reach the substrates 1 and 2.

Signal electrodes 4 made of a transparent conductive film such as an ITO film are formed in a stripe shape on the inner surface of the upper glass substrate 2 facing the liquid crystal layer 9. A vertical alignment layer 5a made of polyimide or the like is formed on substantially the entire inner surface of the glass substrate 2 covering the signal electrodes 4.

A color filter (not shown) and a black matrix (not shown) are formed on the inner surface of the lower glass substrate 1 facing the liquid crystal layer 9. Signal electrodes 3 made of a transparent conductive film such as an ITO film are formed on the resultant substrate in a stripe shape crossing the stripe shape of the signal electrodes 4. The crossings between the signal electrodes 3 and the signal electrodes 4 define pixel regions 6. The color filter (not shown) is composed of colored portions of R, G, and B colors, which are sequentially formed to correspond to the respective pixel regions (e.g., RGBRGB . . . ). The black matrix (not shown) is formed so as to fill the gaps between the colored portions of the color filter. The column structures 7 are regularly arranged on the lower glass substrate 2.

Figure 1C:
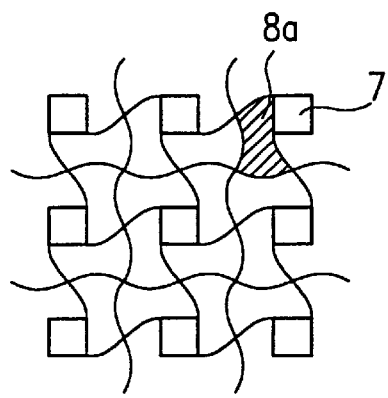
FIG. 1C is a plan view illustrating the orientation direct of liquid crystal molecules.

For example, the column structures 7 are arranged at four corners of each square of a lattice as shown in FIG. 1B. A square region defined by four adjacent column structures 7 as the four corners thereof constitutes a liquid crystal region 8. One pixel region 6 includes a plurality of such liquid crystal regions 8. As shown in FIG. 1C, each of the liquid crystal regions 8 includes a plurality of liquid crystal domains 8a. The liquid crystal domains 8a are formed as a result of the orientation regulation of liquid crystal molecules in each liquid crystal region 8 by the column structures 7. In the embodiment shown in FIGS. 1A, 1B, and 1C, the positions and sizes of the liquid crystal domains 8a are determined by the orientation regulating force of the column structures 7 arranged in the lattice shape so that four liquid crystal domains 8a are positioned as illustrated in FIG. 1C in the liquid crystal region 8.

The "liquid crystal domain" as used herein refers to a minimum region where the orientation of liquid crystal molecules is continuous. No disclination line which is generated by a discontinuous change of the orientation of liquid crystal molecules exists in each liquid crystal domain. Any adjacent liquid crystal domains form a disclination line. A plurality of liquid crystal domains are separated from one another by disclination lines. A center axis obtained when liquid crystal molecules are oriented axial symmetrically is not considered as a disclination line.

Figure 2A:
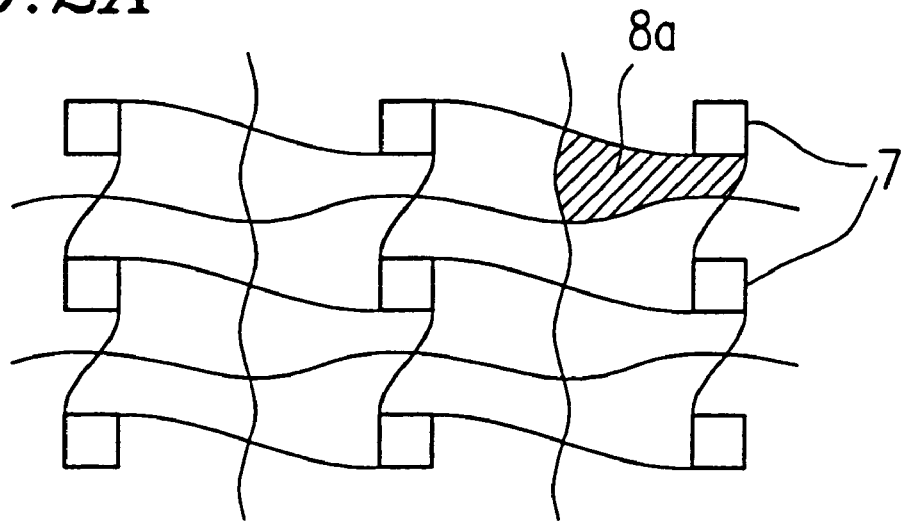
FIGS. 2A to 2D are schematic plan views illustrating the arrangement of column structures as main components of the present invention.
Figure 2B:
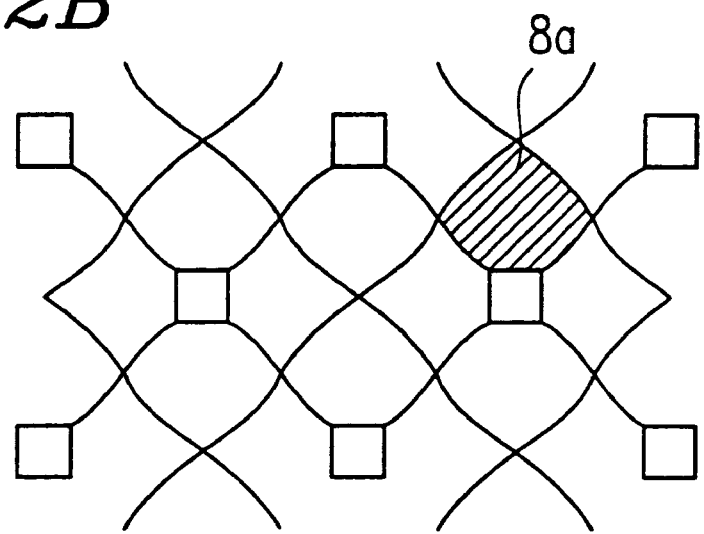
Figure 2C:
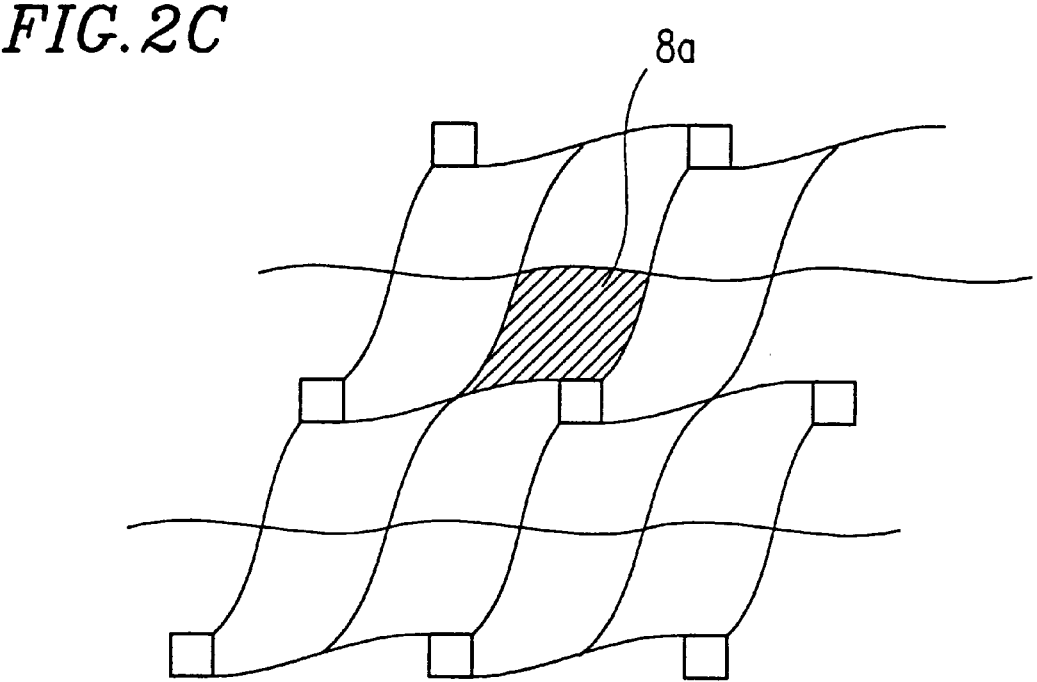
Figure 2D:
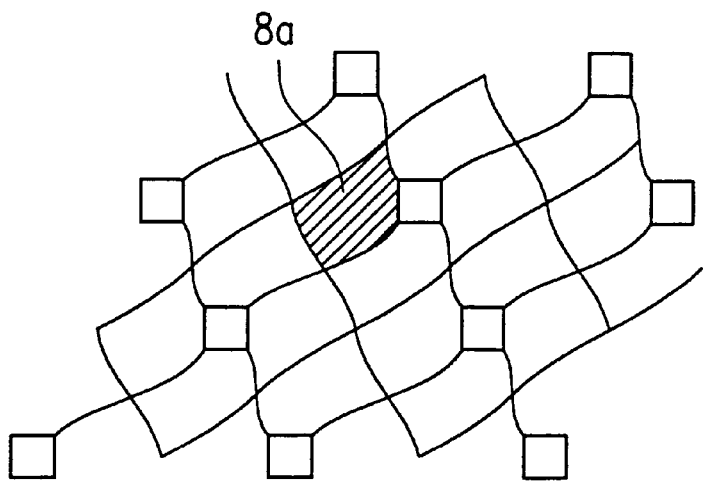

The column structures 7 may be arranged in any other shapes as long as they are arranged regularly. The regular arrangement of the column structures 7 further improves the averaging of the orientation directions of liquid crystal molecules in the liquid crystal regions, as will be described in detail hereinafter. For example, as shown in FIG. 2A, the regular pitch of the arrangement of the column structures 7 in the vertical direction may be different from the regular pitch thereof in the horizontal direction. As shown in FIG. 2B, the column structures 7 may be arranged in the center of each square of the lattice in addition to the four corners of the square. As shown in FIG. 2C, the adjacent four column structures 7 may form a diamond or parallelogram shape as a unit of the lattice. As shown in FIG. 2D, the column structures 7 may be arranged in the center of each diamond or parallelogram of the lattice in addition to the four corners thereof. Alternatively, the crossings of the lattice shape at which the column structures are formed may be displaced regularly. Alternatively, the adjacent column structures 7 may form a triangle as a unit of the lattice. The section of the column structures is not limited to a square, but it may be a polygon such as a rectangle, a circle, or an oval. FIGS. 2A to 2D also illustrate the liquid crystal domains 8a formed in the respective arrangements of the column structures 8.

Referring to FIG. 1A again, a vertical alignment layer 5b made of polyimide or the like is formed on the resultant inner surface of the lower glass substrate 1, more specifically, on the side faces of the column structures 7 as the orientation regulating elements and the portions of the inner surface of the lower glass substrate 1 where the column structures 7 are not formed. The vertical alignment layer 5b may also be formed on the top faces of the column structures 7 (the faces in contact with the vertical alignment layer 5a).

The regular pitch at which the column structures 7 are arranged is critical because it determines the orientation state of the liquid crystal layer of the liquid crystal display device as a final product. In a display mode employed in the present invention, the size of the liquid crystal domains 8a is regulated depending on the pitch of the column structures 7 (the distances between the adjacent column structures 7 in the vertical and horizontal directions). If the pitch exceeds 300 μm, the difference in the transmittance between the liquid crystal domains 8a becomes visible, generating an uneven display. In reverse, if the pitch is less than 10 μm, there is a rate increase of the total area of the column structures 7 existing in each pixel region 6 which may be a square having a side of about 100 μm, for example, with respect to the area of the pixel region 6, resulting in reducing the aperture ratio. Accordingly, the pitch of the column structures 7 is preferably in the range of 10 μm to 300 μm inclusive. Moreover, in order to achieve a sufficient random orientation of liquid crystal molecules in one pixel region, at least four column structures 7 are preferably formed for each pixel region.

The column structures 7 are basically formed to be at least partly in contact with the substrates 1 and 2, so that the column structures 7 also serve as spacers for defining the thickness of the liquid crystal layer 9 (cell gap). For this purpose, the height of the column structures 7 is preferably about 6 μm, for example. This eliminates a step of dispersing spacer beads for defining the cell gap of the liquid crystal layer. Moreover, the portions where the column structures 7 are formed include no liquid crystal material and thus do not contribute to the brightness of the cell. Accordingly, the size (bottom area) of each column structures 7 is desirably as small as possible. If the side of the square of the bottom section (or the diameter if the bottom section is a circle) of the column structure 7 is less than 5 μm, it is difficult to process such a narrow column structure. Moreover, such a narrow structure will be likely to deform and thus find difficulty in serving as the spacer for securing the cell thickness. If the size exceeds 100 μm, conversely, the aperture ratio reduces to an undesirable extent for display. Accordingly, the size of the column structures 7 is preferably in the range of 5 μm to 100 μm inclusive.

Since the liquid crystal display device according to the present invention does not employ a display mode in which liquid crystal molecules must be oriented unidirectionally, a rubbing step can be omitted. In the display mode employed in the present invention, the vertical alignment film 5b may not be successfully applied to the top or side of the column structures 7 due to repulsion of the applied material against the surfaces. This problem can be overcome by performing surface treatment for the surface of the resultant substrate on which the column structures 7 have been formed. Such surface treatment includes silane coupling and dry etching.

The lower substrate 1 on which the column structures 7 are formed may be a substrate having pixel electrodes, thin film transistors (TFT), interconnections, and the like formed thereon in an active matrix liquid crystal display device where ON/OFF control is performed for respective pixels using TFTs or the like as switching elements. A counter substrate opposing the above substrate having counter electrodes and a color filter as required may also be used as the substrate on which the column structures 7 are formed. When the present invention is applied to a plasma addressed liquid crystal display device, a thin glass substrate constituting a plasma cell formed in contact with a liquid crystal layer may be used.

(Liquid Crystal Material and Orientation State Thereof)

The display mode employed in the liquid crystal display device of the present invention is the normally-black mode. Accordingly, an n-type liquid crystal material in which liquid crystal molecules fall in the direction parallel to the substrates when a voltage is applied, i.e., a liquid crystal material having a negative dielectric anisotropy is used.

FIGS. 3A and 3B illustrate the operation in the above display mode of the liquid crystal display device of the present invention. In FIGS. 3A and 3B, as in FIG. 1A, the liquid crystal display device includes a lower substrate 50 having first electrodes 53 formed thereon and an upper substrate 60 having second electrodes 63 formed thereon, with a liquid crystal layer 69 interposed between the substrates 50 and 60. Column structures 51 are regularly arranged on the lower substrate 50, and a vertical alignment film 52 is formed covering the column structures 51 and the first electrodes 53. A vertical alignment layer 61 is formed on the upper substrate 60 covering the second electrodes 63.

When no voltage is applied, liquid crystal molecules are oriented substantially vertical to the substrates 50 and 60 by the orientation regulating force of the vertical alignment films 52 and 61 as shown in FIG. 3B. When a voltage is applied, as shown in FIG. 3A, the orientation directions of the liquid crystal molecules are controlled by the column structures 51 as the orientation regulating elements so that they tend to orient in parallel with the substrates 50 and 60, i.e., they are closer to the direction vertical to the side faces of the column structures 51. Since the column structures 51 which are formed to be at least partly in contact with the upper and lower substrates 50 and 60 can be arranged to control the size and the position of liquid crystal domains, a sufficiently large number of liquid crystal domains can be formed in each pixel corresponding to the arrangement of the column structures 51. Since the liquid crystal molecules are oriented over all azimuthal directions radially from each column structure 51 as a center, the orientation directions of the liquid crystal molecules in each pixel region are averaged over all the azimuthal directions specifically in the case where the column structures 51 are regularly arranged. As a result, a sufficiently random orientation is obtained in each pixel region. In this way, in the liquid crystal display device according to the present invention, the orientation direction of liquid crystal molecules is continuous in each liquid crystal domain, while the orientation directions of liquid crystal molecules are random among the liquid crystal domains.

As used herein, the wording "the liquid crystal molecules are randomly oriented among a plurality of liquid crystal domains" means that the liquid crystal molecules in the plurality of liquid crystal domains are oriented so that the sum of mean orientation vectors in azimuthal directions of the liquid crystal molecules for the plurality of liquid crystal domain is substantially zero.

Figure 3C:
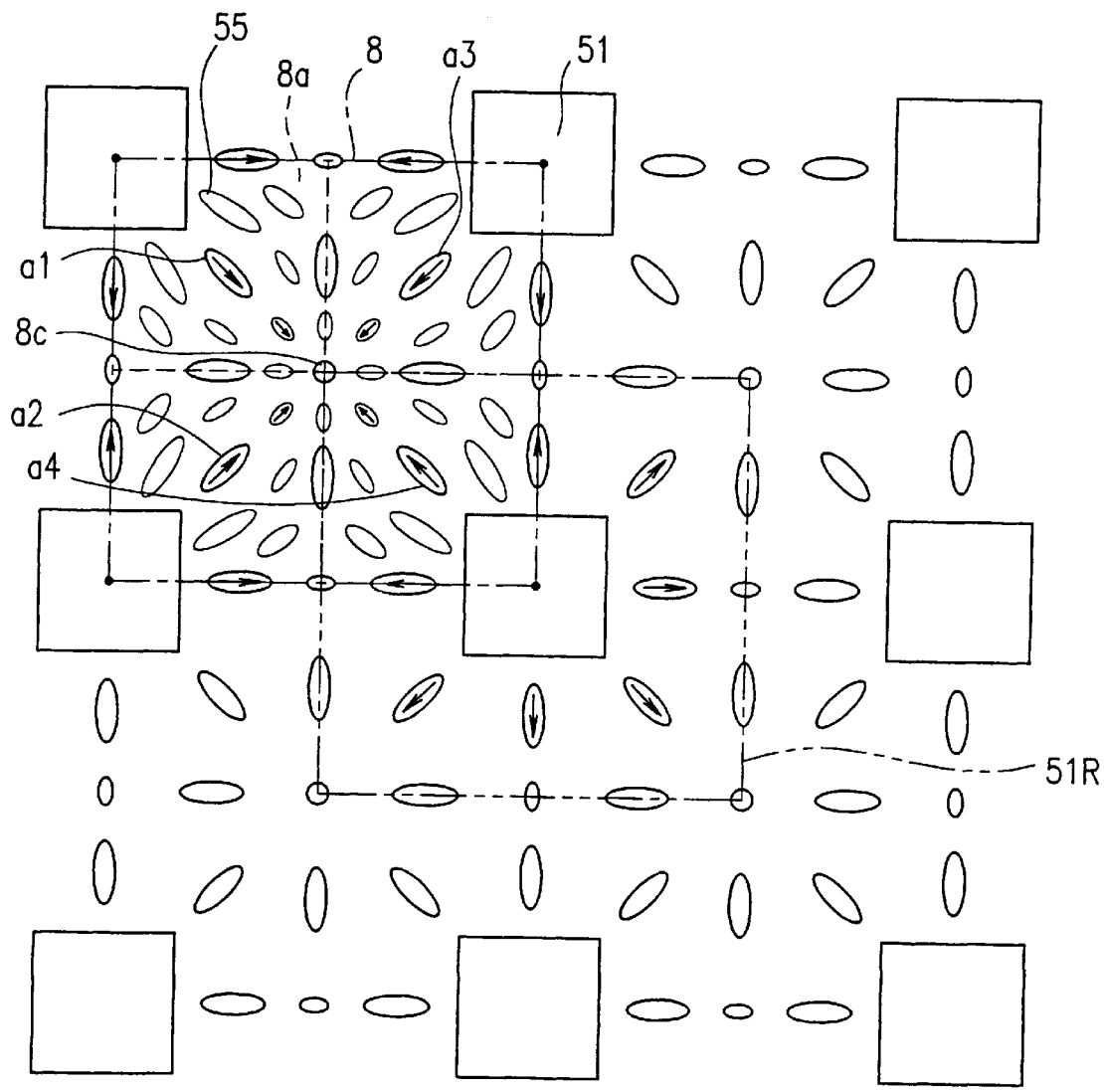
FIGS. 3A and 3B are schematic sectional views illustrating ON and OFF states, respectively, of liquid crystal molecules of the liquid crystal display device according to the present invention.
FIG. 3 is a plan view illustrating an example of orientations of liquid crystal molecules.

When the column structures 51 are arranged at four corners of each square of a lattice as shown schematically in FIG. 3C, in each liquid crystal domain 8a of the liquid crystal region 8 defined by four column structures 51, liquid crystal molecules 55 are continuously oriented in directions from the column structures 51 to a center point 8c by the orientation regulating force of the column structures 51. Although FIG. 3C illustrates the detailed orientation state of liquid crystal molecules only in the upper left liquid crystal region, the other liquid crystal regions have substantially the same orientation state. The liquid crystal molecules 55 are oriented in different directions among the liquid crystal domains 8a, realizing the random orientation in the liquid crystal region 8. Typical orientation directions in the respective liquid crystal domains, i.e., mean orientation vectors in the respective liquid crystal domains, are shown by arrows a1 to a4. Thus, the orientation directions of liquid crystal molecules are macroscopically averaged through the entire liquid crystal panel. The transmittance intensity in various observation directions is substantially made symmetric. In other words, the anisotropy of the refractive index is averaged. The viewing angle dependency is eliminated. Thus, the display quality of the resultant liquid crystal display device can be improved. Moreover, since the size of each liquid crystal domain can be made too small to be visible by the human eyes, a display without an uneven display can be obtained, and thus the display quality of the liquid crystal display device can be improved.

As described above, in the liquid crystal display device of the present invention, the liquid crystal molecules are oriented radially from each column structure 51 as a center. The liquid crystal molecules existing around a certain column structure also receive orientation regulating forces from the column structures located adjacent to the center column structure. As a result, the liquid crystal domains are formed. In the above arrangement, when one column structure is focused, a plurality of liquid crystal domains having different orientation directions are formed around the column structure. In FIG. 3C, for example, four liquid crystal domains are formed in a region 51R surrounding one column structure. Therefore, it can be expressed that the plurality of column structures formed in the liquid crystal display device of the present invention are configured so that a plurality of liquid crystal domains having different orientation directions are formed around each column structure.

In order to stabilize the orientation state of liquid crystal molecules, a curable monomer may be added to the liquid crystal material. In general, in a display mode where an n-type liquid crystal material is used and no rubbing is performed, the direction in which liquid crystal molecules fall is not determined, and thus the response speed tends to be delayed. This can be overcome by adding a curable monomer to the liquid crystal material and curing the monomer by irradiating with light (ultraviolet) while applying a voltage, i.e., curing the monomer under sufficiently stabilized conditions. That is, the direction in which liquid crystal molecules fall can be determined and thus the response speed can be improved. In this way, a curable monomer can be used to determine the orientation direction of liquid crystal molecules.

(Combination with Voltage Application Means)

In the liquid crystal display device of the present invention, a means for applying a voltage to the liquid crystal layer is not specified. However, a particularly large effect can be obtained if the present invention is combined with a plasma discharge cell.

Figure 4:
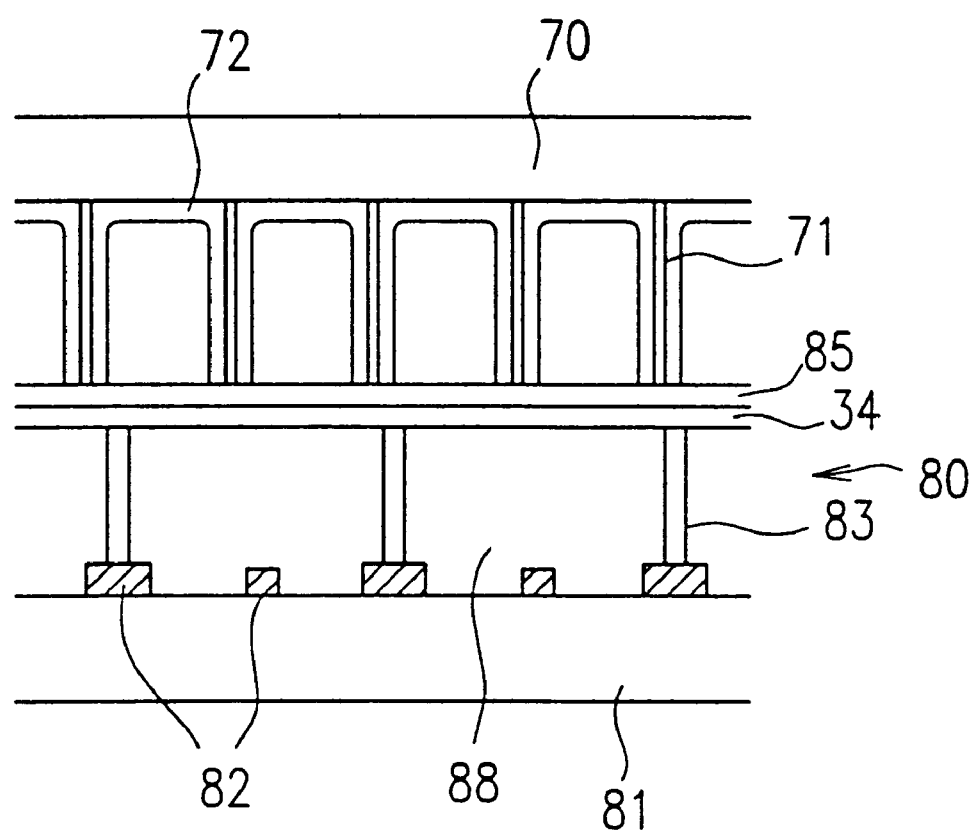
FIG. 4 is a sectional view of an exemplary cell configuration of an plasma addressed liquid crystal display device according to the present invention.

FIG. 4 is a sectional view of a plasma addressed liquid crystal display device using a plasma discharge cell as a voltage application means.

Referring to FIG. 4, the plasma addressed liquid crystal display device includes a plasma discharge cell 80 having plasma generation electrodes 82 which are typically anodes and cathodes and a counter substrate 70 having column structures 71 as orientation regulating elements and a vertical alignment layer 72 constituting a display cell. The plasma discharge cell 80 further includes ribs 83 which divide a space between a substrate 81 and a thin glass substrate 34 facing the substrate 81 into a plurality of plasma spaces 88 (plasma discharge channels) in a stripe shape. Gas for plasma generation such as He, Ne, or Ar is sealed in each of the plurality of plasma spaces 88. The ribs 83 also serve to support the thin glass substrate 34 so as to be apart from the substrate 81 keeping a predetermined distance therebetween. A vertical alignment film 85 is formed on the thin glass substrate 34 as required.

In this illustrative example, the column structures 71 are formed on the substrate 70 because they are difficult to be formed on the thin glass substrate 34 of the plasma discharge cell 80. In this type of plasma addressed liquid crystal display device, since the plasma spaces 88 in a stripe shape separated from one another by the ribs 83 of the plasma discharge cell 80 serve as driving electrodes, only interconnections (not shown) for driving the liquid crystal layer may be provided on the counter substrate 70 in the direction crossing the plasma spaces in a stripe shape.

As described with respect to the prior art, since the plasma generation electrodes 82 and the ribs 83 of the plasma discharge cell 80 are formed by a method suitable for a large-screen display device, such as printing, they cannot be precisely positioned. Therefore, it is conventionally very difficult to bond the plasma discharge cell 80 and the substrate 70 having the column structures 71 for controlling the orientation of liquid crystal molecules for each pixel and the vertical alignment layer 72 in consideration of the positional precision.

According to the present invention, the column structures 71 as the orientation regulating elements are provided at a pitch smaller than the pixel size, and the ratio of the total area projected to a display plane of the column structures with respect to the area of the pixel region or aperture is small. Thus, most of the region of each transparent electrode as a signal electrode can effectively contribute to display. This eliminates the necessity of a precise control of alignment between the plasma cell and the display cell at a step of attaching them together, which was conventionally required in order that each physical aperture of the plasma cell corresponds to the liquid crystal domain of the liquid crystal cell. In other words, according to the present invention, the plasma discharge cell and the counter substrate can be attached together without alignment. This improves the production yield and thus markedly reduces the production cost. Moreover, since a liquid crystal domain sufficiently smaller than each pixel can be formed by appropriately selecting the pitch of the arrangement of the column structures, the viewing angle dependency is improved.

Hereinbelow, the present invention will be described by way of example with reference to the relevant drawings.

EXAMPLE 1

Figure 5A:
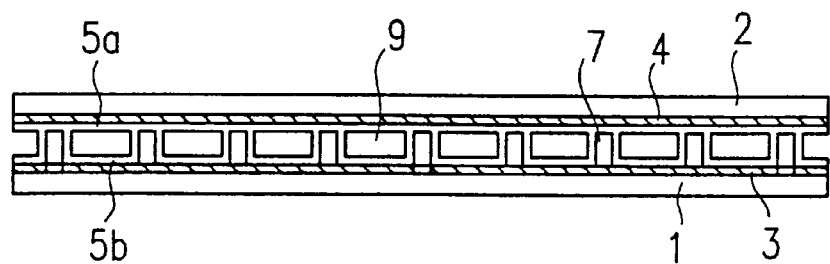
FIG. 5A is a sectional view schematically illustrating a liquid crystal display device of Example 1 according to the present invention.
Figure 5B:
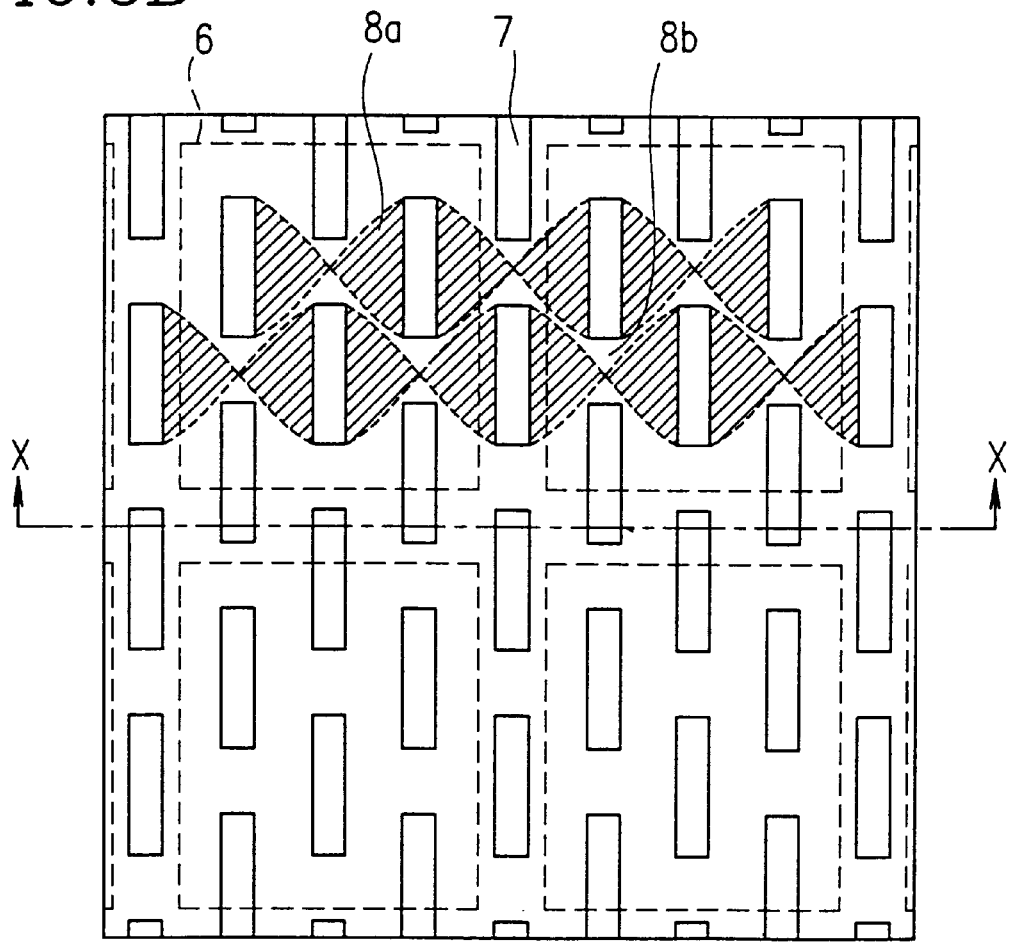
FIG. 5B is a plan view of the liquid crystal display device of FIG. 5A.

FIGS. 5A and 5B schematically illustrate a liquid crystal display device of Example 1 according to the present invention, where FIG. 5A is a sectional view thereof taken along line X—X of FIG. 5B which is a plan view thereof.

Transparent signal electrodes 4 made of ITO were formed on a glass substrate 2, and then JALS-945 (manufactured by Japan Synthetic Rubber Co., Ltd.) was applied to the resultant substrate by spin coating to form a vertical alignment layer 5a. Transparent signal electrodes 3 made of ITO were also formed on a glass substrate 1. Then, a photosensitive resin was applied to the glass substrate 1 and patterned using a photomask to form column structures 7 having a height of about 6 $\mu$m at a pitch of 50 $\mu$m. JALS-945 (manufactured by Japan Synthetic Rubber Co., Ltd.) was then applied to the resultant substrate by spin coating to form a vertical alignment layer 5b. The resultant two substrates were bonded together, and an n-type liquid-crystal material was injected in a space between the substrates to form a liquid crystal layer 9 (the twist angle specific to the liquid crystal material was set so as to obtain 90° twist under $\Delta\epsilon$=−2.7, $\Delta$n=0.079, and a cell gap of 6 $\mu$m). Thus, a liquid crystal cell having the column structures 7 was obtained. As shown in FIG. 5B, each pixel region 6 is configured to include a plurality of liquid crystal domains 8a and 8b (unshaded portion). Among these liquid crystal domains 8a and 8b, the orientation directions of the liquid crystal molecules are different from each other.

The column structures 7 may be made of a photosensitive acrylic, methacrylate, polyimide, or rubber material. Any photosensitive material which is so strong that the resultant column structures 7 are durable against a tool force (about 400 g/$\phi$) may be used.

Polarizing plates (not shown) are disposed on the opposite surfaces of the resultant liquid crystal cell so as to be in the crossed-Nicols state, to complete the liquid crystal display device of Example 1.

Figure 6:
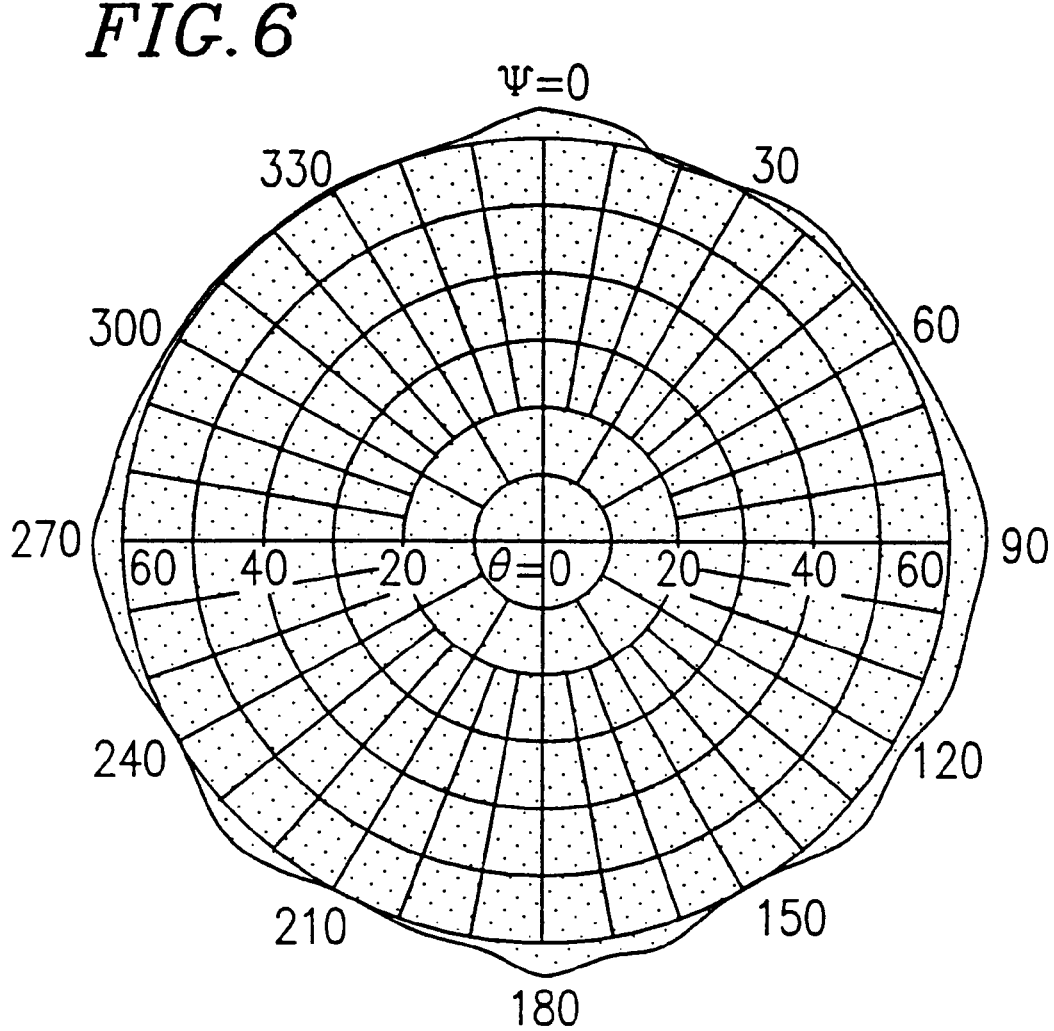
FIG. 6 is a view illustrating the contrast-viewing angle characteristic of the liquid crystal display device of Example 1.

FIG. 6 illustrates the contrast-viewing angle characteristic of the liquid crystal display device of Example 1. In FIG. 6, $\psi$ denotes an azimuth (an angle in the display plane), $\theta$ denotes a viewing angle (a tilt from the normal of the display plane), and the hatching denotes the region where the contrast ratio is 10:1 or more.

As is observed from FIG. 6, the liquid crystal display device of this example achieves the contrast ratio of 10:1 or more when the right and left viewing angle (2×$\theta$) is 120° or more over the all azimuths $\psi$.

EXAMPLE 2

In Example 2, an alignment fixing layer is formed on at least one substrate for stabilizing the orientation state of liquid crystal molecules when a voltage is applied.

Figure 7A:
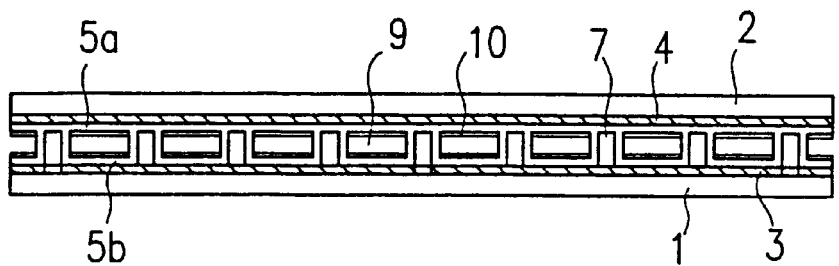
FIG. 7A is a sectional view schematically illustrating a liquid crystal display device of Example 2 according to the present invention.
Figure 7B:
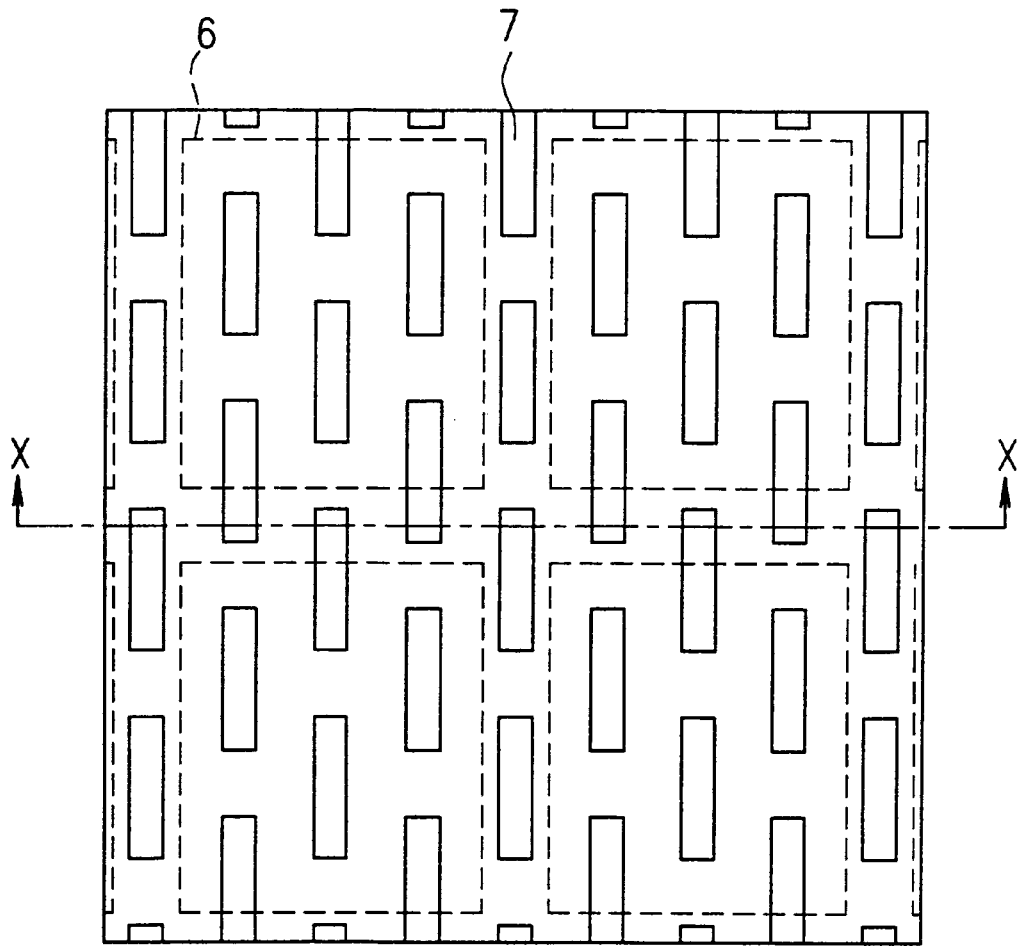
FIG. 7B is a plan view of the liquid crystal display device of FIG. 7A.

FIG. 7A and 7B illustrate a liquid crystal display device of Example 2, which has the same configuration as the liquid crystal display device of Example 1 except that an axial symmetric alignment fixing layer 10 is formed on each of the vertical alignment layers 5a and 5b. The liquid crystal display device of this example is fabricated in the following manner.

Transparent signal electrodes 4 made of ITO were formed on a glass substrate 2, and then JALS-945 (manufactured by Japan Synthetic Rubber Co., Ltd.) was applied to the resultant substrate by spin coating to form the vertical alignment layer 5a. Transparent signal electrodes 3 made of ITO were formed on a glass substrate 1. Then, photosensitive polyimide was applied to the glass substrate 1 and patterned using a photomask to form column structures 7 having a height of about 6 $\mu$m at a pitch of 50 $\mu$m. JALS-945 (manufactured by Japan Synthetic Rubber Co., Ltd.) was then applied to the resultant substrate by spin coating to form the vertical alignment layer 5b.

The resultant substrates were bonded together, and then, in this example, a mixture of 0.3 wt. % of compound A represented by formula (1) below and 0.1 wt. % of Irgacur 651 was injected as a photocurable material in the liquid crystal cell in addition to the n-type liquid crystal material (set at 90° twist under $\Delta\epsilon$=−2.7, $\Delta$n=0.079, and a cell gap of 6 $\mu$m).

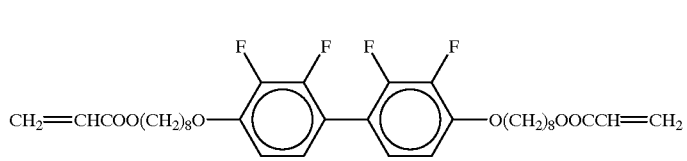

(1)

After the injection, the resultant liquid crystal cell was irradiated with ultraviolet light (intensity at 365 nm: 6 mW/cm$^2$) at room temperature (25° C.) for ten minutes to cure the photocurable material of the mixture. As a result, the alignment fixing layer 10 was formed covering the vertical alignment layers 5a and 5b on the substrates as shown in FIG. 7A. By the formation of the alignment fixing layer 10, liquid crystal regions 8 in each of which an axis was fixed at a predetermined position to allow for axial symmetric alignment of liquid crystal molecules were formed in a pixel region 6 of the liquid crystal layer 9.

Polarizing plates (not shown) were disposed on the opposite surfaces of the resultant liquid crystal cell so as to be in the crossed-Nicol state, to complete the liquid crystal display device of Example 2. The resultant liquid crystal display device exhibited the same viewing angle characteristic as that obtained in Example 1. Although the photocurable material was used in Example 2, a thermocurable material may also be used.

Figure 8:
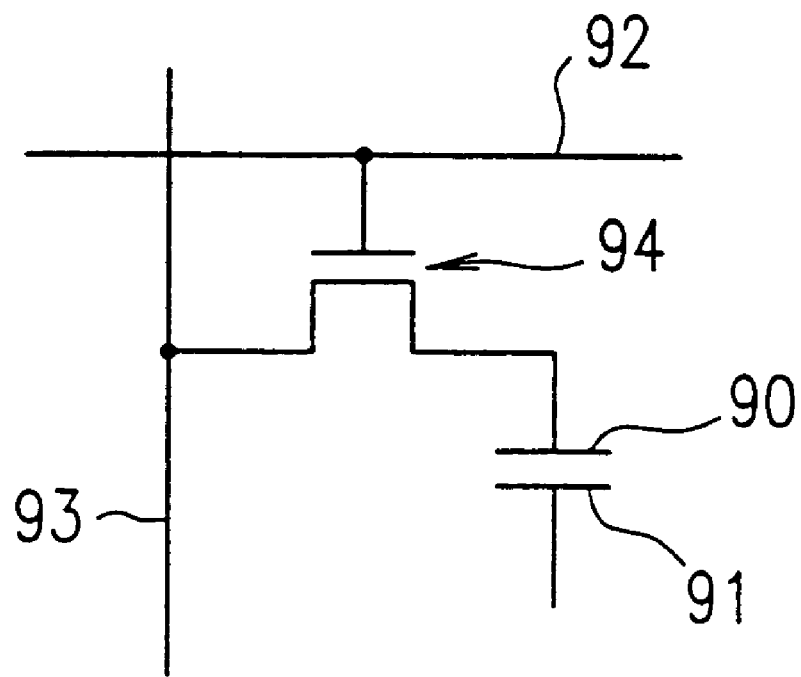
FIG. 8 is a schematic view illustrating a TFT as a driving element applicable to the present invention.

The liquid crystal display devices of Examples 1 and 2 are of a passive matrix type where signal electrodes are formed to cross each other on each of a pair of substrates. The present invention can also be applied to an active matrix type. An active matrix type liquid crystal display device has a configuration realizing an equivalent circuit shown in FIG. 8. That is, pixel electrodes 90 are formed in a matrix on a first one of a pair of substrates facing each other with a display medium interposed therebetween, and a counter electrode 91 is formed on substantially the entire surface of the other substrate. Signal electrode lines 92 and 93 are formed on the lower substrate to cross each other with an insulating film therebetween. Three-terminal elements, such as thin film transistors (TFTs) 94 are formed as switching elements in the vicinity of the crossings of the signal electrode lines.

EXAMPLE 3

Figure 9:
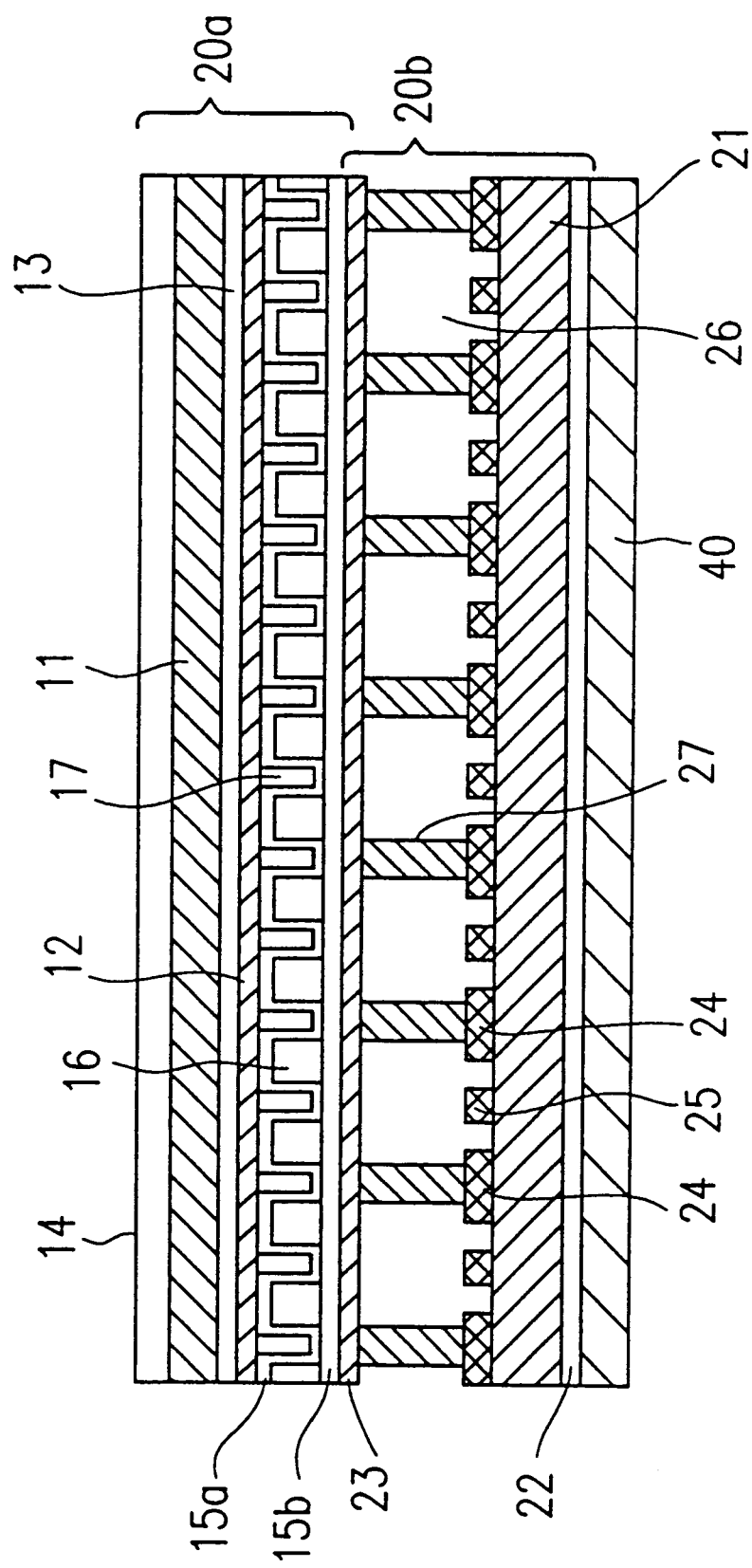
FIG. 9 is a sectional view illustrating a plasma addressed liquid crystal display device of Example 3 according to the present invention.
Figure 10:
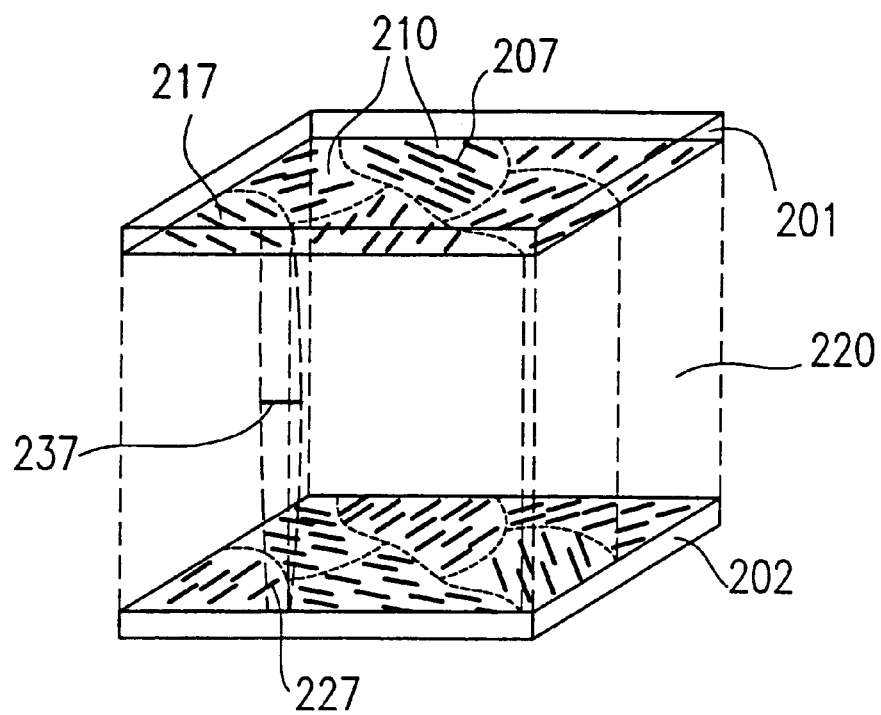
FIG. 10 is a perspective view illustrating a conventional liquid crystal display panel.
Figure 11:
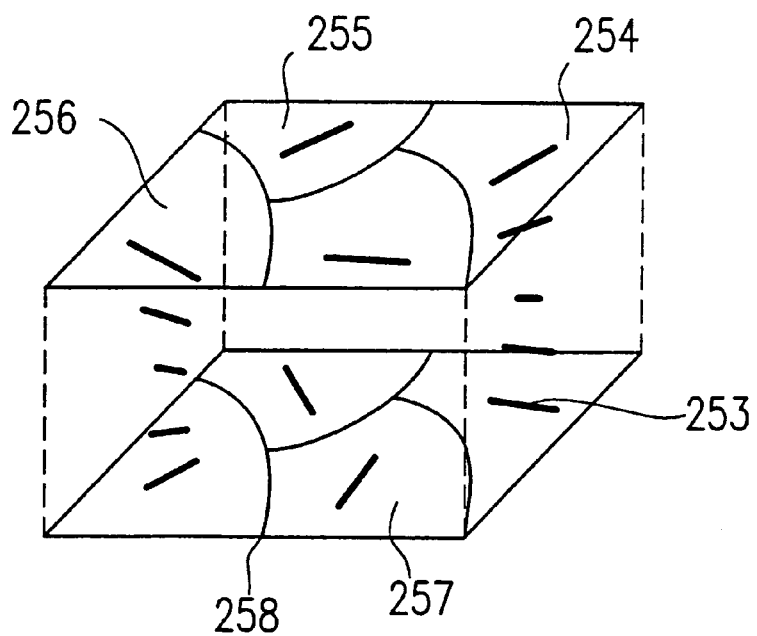
FIG. 11 is a perspective view illustrating a macroscopical orientation state of liquid crystal molecules in one pixel of another conventional liquid crystal display panel.
Figure 12A:
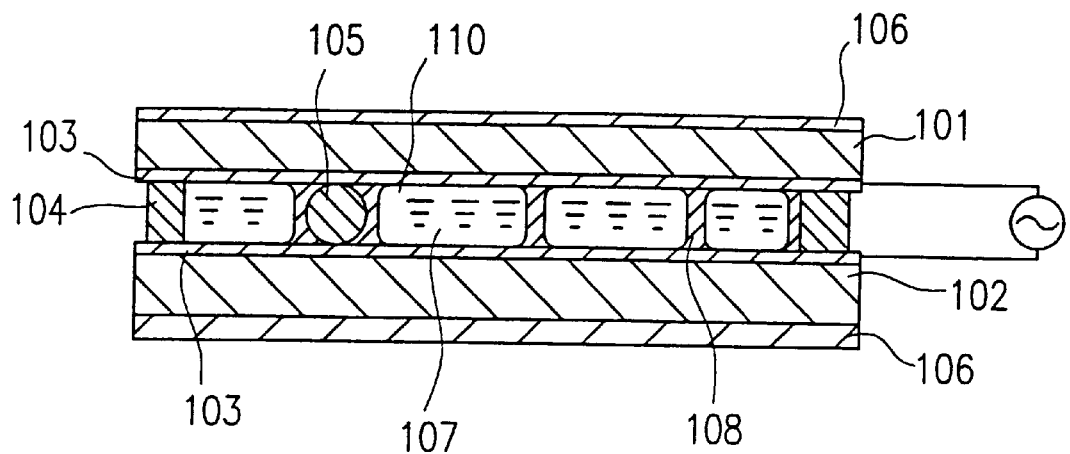
FIG. 12A is a sectional view illustrating still another conventional liquid crystal display device.
Figure 12B:
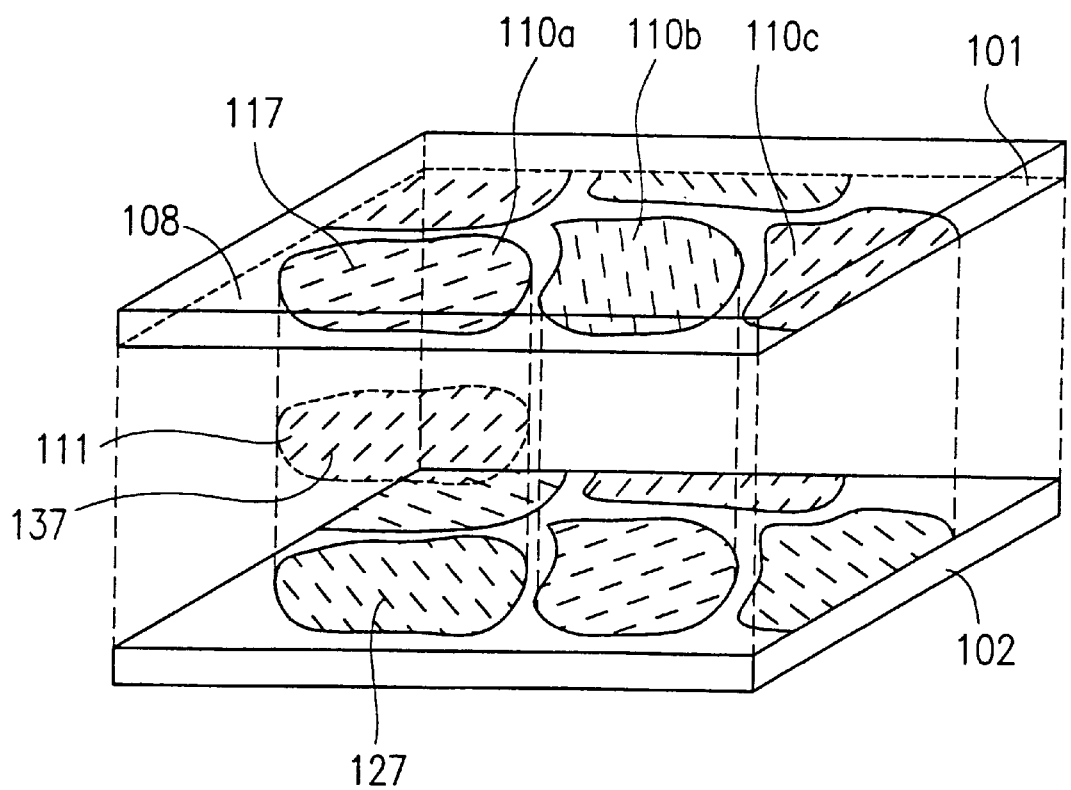
FIG. 12B is a perspective view illustrating a liquid crystal cell of the liquid crystal display device of FIG. 12A.

In Example 3, the present invention is applied to a plasma addressed liquid crystal display device. FIG. 9 is a sectional view of a plasma addressed liquid crystal display device of Example 3.

Referring to FIG. 9, the plasma addressed liquid crystal display device has a flat panel structure including a display cell 20a and a plasma cell 20b. The display cell 20a displays images by modulating incident light to output light according to pixel signals. The plasma cell 20b scans (addresses) the display cell 20a. The display cell 20a and the plasma cell 20b share an intermediate sheet. The plasma cell 20b includes stripe-shaped discharge channels 26 arranged in a row direction for discharging plasma to scan the display cell 20a in a line-sequential manner. The respective discharge channels 26 include partitions 27 for defining spaces of the discharge channels 26 in a row direction, anode electrodes 24 located at the bottoms of the partitions 27, and cathode electrodes 25 located in the spaces in the middle between the adjacent anode electrodes 24. The anode electrodes 24 and the cathode electrodes 25 relate to opposite electrical polarity from each other and are spaced apart from each other. These electrodes are made of a material which does not transmit light, and thus define physical apertures therebetween, to allow light incident on the liquid crystal display device to pass only through these physical apertures.

The display cell 20a includes stripe-shaped signal electrodes 13 arranged in a column direction crossing the row direction in which the discharge channels 26 are lined. Liquid crystal regions are formed at the crossings of the discharge channels 26 and the signal electrodes 13. The signal electrodes 13 apply image signals to a display medium layer 16 in synchronization with the line-sequential scanning, to modulate the incident light for each pixel. The display cell 20a and the plasma cell 20b are isolated from each other by the intermediate sheet 23. The plasma cell 20b includes a glass substrate 21 to be bonded to the back surface of the intermediate sheet 23, while the display cell 20a includes a glass substrate 11 to be bonded to the top surface of the intermediate sheet 23. The liquid crystal layer 16 is formed as the display medium layer 16 between the glass substrate 11 and the intermediate sheet 23. The signal electrodes 13 made of a transparent material and a color filter 12 are formed on the inner surface of the glass substrate 11 in this order. Column structures 17 are formed on the resultant substrate at a predetermined pitch, and a vertical alignment layer 15a is formed covering the surfaces of the column structures 17 and the surface of the substrate 11. Another vertical alignment film 15b is formed on the surface of the intermediate sheet 23 facing the display medium layer 16.

Figure 13A:
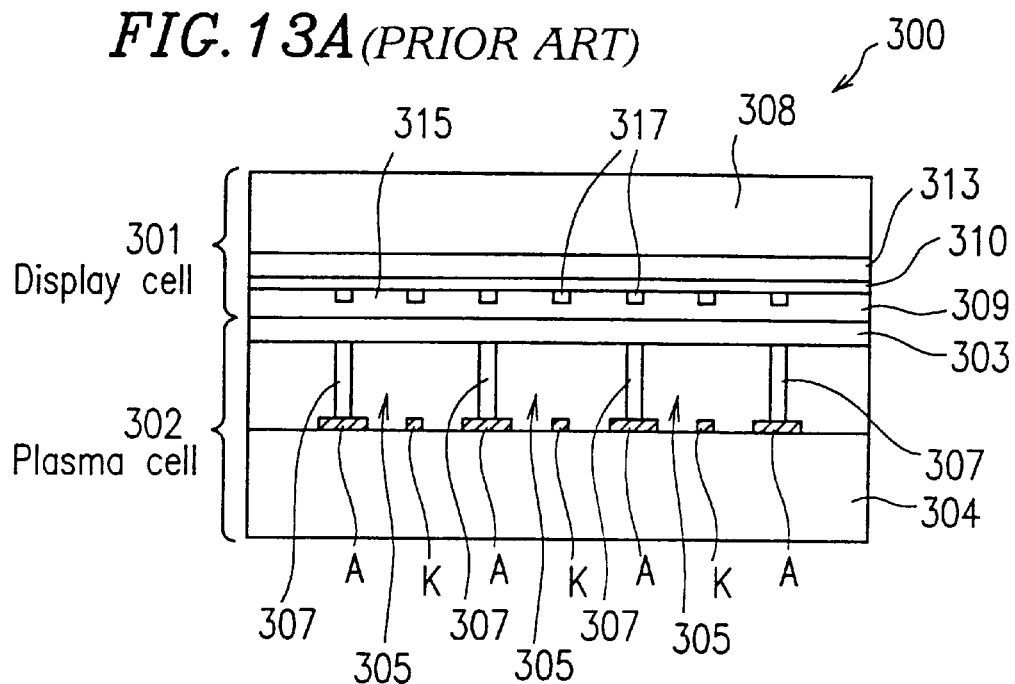
FIG. 13A is a sectional view illustrating a conventional plasma addressed liquid crystal display device.
Figure 13B:
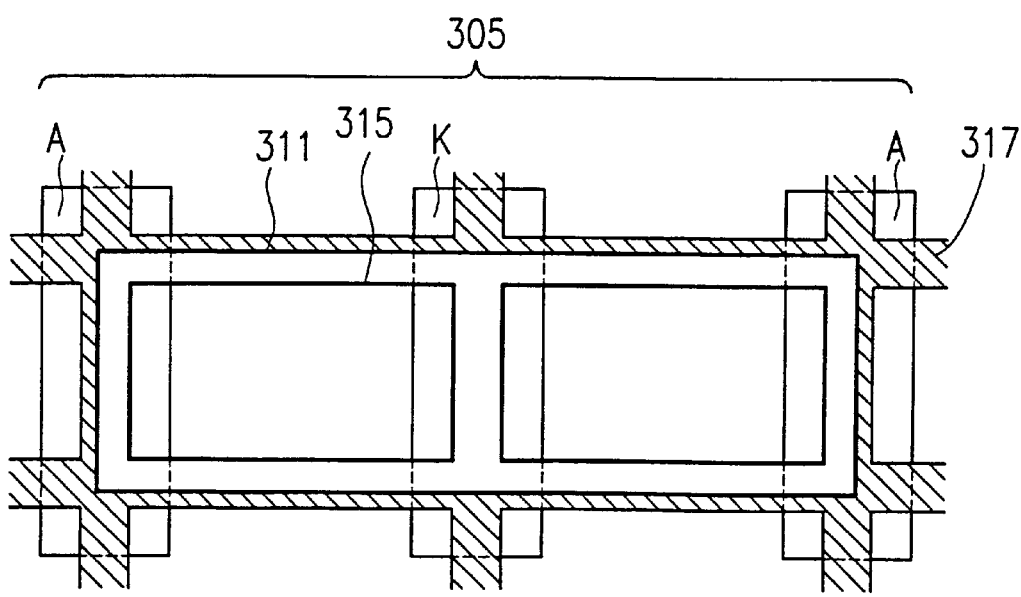
FIG. 13B is a plan view illustrating one pixel of the liquid crystal display device of FIG. 13A.

The liquid crystal layer 16 as the display medium layer is divided into a plurality of liquid crystal domains defined by the column structures 17, which have a predetermined size and formed at predetermined positions. Each pixel region is configured to include a plurality of liquid crystal domains, and the pixel region, which has two physical apertures as described above with reference to FIG. 13B, is driven with a plasma addressed element composed of the discharge channel 26 and the signal electrode 13.

Thus, in Example 3, since the column structures 17 are formed at a pitch smaller than the pixel size, and the ratio of the total area projected to a display plane of the column structures with respect to the area of the pixel region or aperture is small. Moreover, by appropriately selecting the pitch of the arrangement of the column structures, a number of liquid crystal domains having a size sufficiently small than that of the pixel region can be formed. This makes it possible to improve the viewing angle dependency of the liquid crystal display device without providing section walls for allowing liquid crystal molecules to orient axial symmetrically as in the conventional ASM mode plasma addressed display device. When the conventional section walls are formed, the aperture ratio reduces unless the section walls are precisely arranged so as to surround the pixel regions. According to the present invention, however, the column structures 17 can be arranged inside the pixel regions, and thus most of the region of each transparent electrode as the signal electrode can be used as an effective aperture of the liquid crystal cell contributing to display. This eliminates the necessity of precisely aligning the plasma cell and the display cell when they are bonded together so that each physical aperture of the plasma cell and the corresponding liquid crystal domain of the liquid crystal cell are aligned with each other as precisely as possible, to obtain the designed aperture area. Instead, the plasma discharge cell and the display cell can be bonded together without alignment. This improves the production yield and thus markedly reduces the production cost.

Thus, the liquid crystal display device of the present invention has a plurality of column structures which are at least partly in contact with both the pair of substrates sandwiching the liquid crystal layer. With these column structures, the liquid crystal layer is divided into a plurality of liquid crystal domains in a direction in the plane of the substrates. When a voltage is applied, the orientation directions of liquid crystal molecules are continuous in each liquid crystal domain, while they are random among the liquid crystal domains. Accordingly, by providing the column structures at appropriate positions, the viewing angle characteristic can be improved without reducing the aperture ratio of the liquid crystal display device. Since the sizes and the positions of the liquid crystal domains can be regulated by regularly arranging the column structures in the liquid crystal layer, a display allowing for all-direction viewing free from an uneven display can be achieved, improving the display quality of the liquid crystal display device. Since the column structures are at least partly in contact with the upper and lower substrates, they also serve as spacers for controlling the thickness of the liquid crystal layer. This eliminates a step of dispersing spacer beads, improving the yield and reducing the production cost.

In the plasma addressed liquid crystal display device according to the present invention, the area of each column structure may be small compared with the size of each pixel. Accordingly, the reduction of the aperture ratio can be minimized even when a plurality of column structures are formed inside the pixel. This allows for the formation of a plurality of liquid crystal domains in each pixel. Since the plurality of column structures can be formed at a pitch smaller than the pixel size, no alignment margin is required, allowing for the bonding of the plasma cell and the display cell without alignment. According to the present invention, therefore, the pixel aperture ratio can be improved and the yield can be increased compared with the conventional case where a wall structure is formed between adjacent pixels.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of substrates and a liquid crystal layer including liquid crystal molecules having a negative dielectric anisotropy interposed between the pair of substrates, vertical alignment layers being formed on surfaces of the pair of substrates in contact with the liquid crystal layer, a voltage applicator formed on the pair of substrates for applying a voltage across the liquid crystal layer, the liquid crystal molecules being oriented substantially vertical to the pair of substrates when no voltage is applied, said device further including, a plurality of column structures between and at least partly in contact with the pair of substrates, wherein, when said voltage is applied, said column structures cause the liquid crystal layer to have a plurality of liquid crystal domains in a direction in the plane of the substrates, such that orientation directions of the liquid crystal molecules are continuous in each of the liquid crystal domains, while the orientation directions of liquid crystal molecules are random among the liquid crystal domains.

2. A liquid crystal display device according to claim 1, wherein the plurality of column structures are spaced consistently.

3. A liquid crystal display device according to claim 2, wherein the plurality of column structures are arranged at four corners of each square of a lattice.

4. A liquid crystal display device according to claim 3, wherein the corners of each square of the lattice at which the plurality of column structures are arranged are regularly spaced.

5. A liquid crystal device according to claim 2, wherein the plurality of column structures are arranged at four corners of each square of a lattice and a center of each square.

6. A liquid crystal display device according to claim 1, wherein a pitch at which the plurality of column structures are arranged is in the range of 10 $\mu$m to 300 $\mu$m inclusive.

7. A liquid crystal display device according to claim 1, wherein a size of the plurality of column structures is in the range of 5 $\mu$m to 100 $\mu$m inclusive.

8. A liquid crystal display device according to claim 1, wherein an alignment fixing layer made of a polymer material is formed on a surface of at least one of the pair of substrates facing the liquid crystal layer.

9. A liquid crystal display device according to claim 1, wherein at least a surface of the pair of substrates on which the plurality of column structures are formed is subjected to surface treatment.

10. A liquid crystal display device comprising a pair of substrates and a liquid crystal layer including liquid crystal molecules having a negative dielectric anisotropy interposed between the pair of substrates, a vertical alignment layer is formed on surfaces of the pair of substrates facing the liquid crystal layer, a voltage applicator formed on the pair of substrates for applying a voltage across the liquid crystal layer, the liquid crystal molecules being oriented substantially vertical to the pair of substrates when no voltage is applied, wherein the voltage applicator includes a plasma cell having a plurality of plasma channels for discharging plasma, said device further including, a plurality of column structures between and at least partly in contact with the pair of substrates, wherein, when said voltage is applied, said column structures cause the liquid crystal layer to have a plurality of liquid crystal domains in a direction in the plane of the substrates, such that orientation directions of liquid crystal molecules are substantially uniform in each of the liquid crystal domains, while the orientation directions of liquid crystal molecules are random among the liquid crystal domains.

11. A liquid crystal display device according to claim 10, wherein the plurality of column structures are spaced consistently.

12. A liquid crystal display device according to claim 11, wherein the plurality of column structures are arranged at four corners of each square of a lattice.

13. A liquid crystal display device according to claim 12, wherein the corners of each square of the lattice at which the plurality of column structures are arranged are regularly spaced.

14. A liquid crystal device according to claim 11, wherein the plurality of column structures are arranged at four corners of each square of a lattice and a center of each square.

15. A liquid crystal display device according to claim 10, wherein a pitch at which the plurality of column structures are arranged is in the range of 10 $\mu$m to 300 $\mu$m inclusive.

16. A liquid crystal display device according to claim 10, wherein a size of the plurality of column structures is in the range of 5 $\mu$m to 100 $\mu$m inclusive.

17. A liquid crystal display device according to claim 10, wherein an alignment fixing layer made of a polymer material is formed on a surface of at least one of the pair of substrates facing the liquid crystal layer.

18. A liquid crystal display device according to claim 10, wherein at least a surface of the pair of substrates on which the plurality of column structures are formed is surface-finished.

19. A liquid crystal display device comprising: a pair of substrates; a liquid crystal layer including liquid crystal molecules having a negative dielectric anisotropy interposed between the pair of substrates; and voltage applicator for applying a voltage to the liquid crystal layer, the liquid crystal molecules in the liquid crystal layer being oriented substantially vertical to the surfaces of the pair of substrates when no voltage is applied, the liquid crystal display device further comprising:

a plurality of column structures formed on at least one of the pair of substrates; and vertical alignment films formed on surfaces of the plurality of column structures and on a surface of the substrate on which the plurality of column structures are formed, wherein a plurality of liquid crystal domains having different orientation directions are formed around each of the plurality of column structures due to an orientation regulating force of the vertical alignment film formed on the surfaces of the plurality of column structures.

* * * * *

UNITED STATES PATENT AND TRADEMARK OFFICE

CERTIFICATE OF CORRECTION

PATENT NO.   : 6,067,141
DATED        : May 23, 2000
INVENTOR(S)  : YAMADA et al

It is certified that error appears in the above-identified patent and that said letters patent is hereby corrected as shown below:

Front page, section [73], insert --Sony Corporation, Tokyo, Japan-- after "Japan".

Signed and Sealed this

Seventeenth Day of April, 2001

*Attest:*

NICHOLAS P. GODICI

*Attesting Officer*   Acting Director of the United States Patent and Trademark Office